US012187045B2

(12) United States Patent
Osakabe

(10) Patent No.: US 12,187,045 B2
(45) Date of Patent: Jan. 7, 2025

(54) INK-JET PRINTER

(71) Applicant: BROTHER KOGYO KABUSHIKI KAISHA, Nagoya (JP)

(72) Inventor: Yoshinori Osakabe, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/465,322

(22) Filed: Sep. 12, 2023

(65) Prior Publication Data

US 2024/0149591 A1 May 9, 2024

Related U.S. Application Data

(63) Continuation of application No. 17/716,406, filed on Apr. 8, 2022, now Pat. No. 11,760,102, which is a
(Continued)

(30) Foreign Application Priority Data

Jan. 19, 2015 (JP) ................................ 2015-008172
Jan. 19, 2015 (JP) ................................ 2015-008173

(51) Int. Cl.
*B41J 2/175* (2006.01)
*B41J 29/13* (2006.01)

(52) U.S. Cl.
CPC ............ *B41J 2/1754* (2013.01); *B41J 2/175* (2013.01); *B41J 2/17509* (2013.01);
(Continued)

(58) Field of Classification Search
CPC .... B41J 2/16526; B41J 2/16532; B41J 2/175; B41J 2/17506; B41J 2/17509;
(Continued)

(56) References Cited

U.S. PATENT DOCUMENTS 5,686,947 A 11/1997 Murray et al.
6,099,115 A 8/2000 Faoro
(Continued)

FOREIGN PATENT DOCUMENTS

CN 203158445 U 8/2013
CN 103660591 3/2014
(Continued)

OTHER PUBLICATIONS

Related U.S. Appl. No. 14/854,203, filed Sep. 15, 2015.
(Continued)

*Primary Examiner* — Anh T Vo
(74) *Attorney, Agent, or Firm* — Merchant & Gould P.C.

(57) ABSTRACT

There is provided an ink-jet printer including: an ink tank including an ink inlet; a cap; and a cover configured to be movable with respect to the ink inlet between a closed position and an open position. The cover includes an inner surface configured to face the ink inlet under a condition that the cover is in the closed position, and a rib provided at the inner surface. The rib is configured to face a part of the cap, in which the cap is sealed the ink inlet under the condition that the cover is in the closed position and the rib is configured to abut against the part of the cap under a condition that the cap is not appropriately sealed the inlet when the cover moving from the open position to the closed position, thereby the cover being prevented from reaching the closed position.

10 Claims, 12 Drawing Sheets

Related U.S. Application Data continuation of application No. 17/012,213, filed on Sep. 4, 2020, now Pat. No. 11,298,948, which is a continuation of application No. 16/407,265, filed on May 9, 2019, now Pat. No. 10,766,266, which is a continuation of application No. 15/845,001, filed on Dec. 18, 2017, now Pat. No. 10,286,674, which is a continuation of application No. 15/293,585, filed on Oct. 14, 2016, now Pat. No. 9,844,947, which is a continuation of application No. 15/000,545, filed on Jan. 19, 2016, now Pat. No. 9,475,298.

(52) U.S. Cl.
CPC ......... *B41J 2/1752* (2013.01); *B41J 2/17536* (2013.01); *B41J 29/13* (2013.01)

(58) Field of Classification Search
CPC .. B41J 2/17513; B41J 2/1752; B41J 2/17523; B41J 2/17566; B41J 2/17596; B41J 29/02; B41J 29/13; B41J 2002/17516
See application file for complete search history.

(56) References Cited

U.S. PATENT DOCUMENTS

| | | | |
|---|---|---|---|
| 6,276,788 | B1 | 8/2001 | Hilton |
| 6,547,363 | B1 | 4/2003 | Shinada |
| 6,565,197 | B1 | 5/2003 | Murray et al. |
| 7,552,998 | B2 | 6/2009 | Yonekawa |
| 7,837,308 | B2 | 11/2010 | Yano |
| 8,905,504 | B2 | 12/2014 | Iizawa |
| 9,475,298 | B2 | 10/2016 | Osakabe |
| 9,844,947 | B2 | 12/2017 | Osakabe |
| 10,286,674 | B2 | 5/2019 | Osakabe |
| 10,363,762 | B2 | 7/2019 | Takabayashi |
| 10,766,266 | B2 | 9/2020 | Osakabe |
| 2005/0174408 | A1 | 8/2005 | Qingguo et al. |
| 2005/0179755 | A1 | 8/2005 | Murakami et al. |
| 2009/0033707 | A1 | 2/2009 | Shimazaki |
| 2013/0169720 | A1 | 7/2013 | Nakamura et al. |
| 2013/0314479 | A1 | 11/2013 | Nozawa |
| 2014/0022314 | A1 | 1/2014 | Nozawa |
| 2014/0043408 | A1 | 2/2014 | Kudo et al. |
| 2014/0063139 | A1 | 3/2014 | Iwamuro et al. |
| 2014/0063147 | A1 | 3/2014 | Iwamuro et al. |
| 2015/0352853 | A1 | 12/2015 | Kudo et al. |
| 2016/0009098 | A1 | 1/2016 | Kimura et al. |
| 2016/0089893 | A1 | 3/2016 | Osakabe |

FOREIGN PATENT DOCUMENTS

| | | | |
|---|---|---|---|
| JP | 51-25208 | | 6/1976 |
| JP | 9-30001 | | 2/1997 |
| JP | 11-504874 | A | 5/1999 |
| JP | 2013-949 | A | 1/2013 |
| JP | 2013-212706 | A | 10/2013 |
| JP | 2013-226726 | A | 11/2013 |
| JP | 2013-226728 | A | 11/2013 |
| JP | 2014-46624 | | 3/2014 |
| JP | 2014-61692 | A | 4/2014 |
| WO | 2014/112344 | A | 7/2014 |
| WO | 2014/132614 | A | 9/2014 |

OTHER PUBLICATIONS

U.S. Office Action (Notice of Allowance) issued in related U.S. Appl. No. 14/854,203, mailed Jun. 13, 2016.
Written Opinion issued in related International Application JP2016/000253, mailed Apr. 12, 2016.
International Search Report issued in related International Application JP2016/000253, mailed Apr. 12, 2016.
U.S. Office Action (Corrected Notice of Allowability) issued in related U.S. Appl. No. 14/854,203, mailed Aug. 15, 2016.
U.S. Office Action (Restriction Requirement) issued in related U.S. Appl. No. 14/854,203, mailed Mar. 14, 2016.
U.S. Office Action (Notice of Allowance) issued in related U.S. Appl. No. 15/611,960, mailed Feb. 12, 2018.
Office Action issued in related Chinese Patent Application No. 201510514790.X, issued Feb. 13, 2018.
U.S. Office Action (Corrected Notice of Allowance) issued in related U.S. Appl. No. 15/611,960, mailed Apr. 25, 2018.
IP.com search cited in Corrected Notice of Allowance issued in related U.S. Appl. No. 15/611,960, mailed Feb. 12, 2018].
U.S. office action issued in related U.S. Appl. No. 16/004,668, mailed Jul. 16, 2018.
Office Action (Notice of Reasons for Rejection) issued in related Japanese Patent Application No. 2014-201864, mailed Jul. 24, 2018.
Office Action issued in related Chinese Patent Application No. 201510514790.X, Oct. 24, 2018.
Office Action (Notice of Allowance) issued in related U.S. Appl. No. 16/004,668, filed Nov. 8, 2018.
Notice of Allowance issued in related U.S. Appl. No. 16/363,470, filed Oct. 8, 2019.
InnovationQ Plus—IP.com search, Sep. 16, 2019, 2 pages.
Office Action issued in earlier U.S. Appl. No. 16/407,265 on Jan. 21, 2020.
Office Action issued in corresponding Indian Patent Application No. 201717024031, Dec. 10, 2019.
Office Action issued in related U.S. Appl. No. 16/407,265, filed Jan. 21, 2020.
Office Action issued in related U.S. Appl. No. 15/845,001, filed Aug. 30, 2018.
Notice of Allowance issued in related U.S. Appl. No. 15/845,001, filed Dec. 26, 2018.
Related U.S. Appl. No. 15/293,585, filed Oct. 14, 2016.
Non-Final Office Action issued in related U.S. Appl. No. 15/293,585, filed May 2, 2017.
Related U.S. Appl. No. 15/000,545, filed Jan. 19, 2016.
U.S. Office Action issued in related U.S. Appl. No. 15/293,585, filed Aug. 18, 2017.
U.S. Office Action (Notice of Allowance) issued in related U.S. Appl. No. 15/000,545 mailed Jun. 22, 2016.
Notice of Allowance issued in earlier U.S. Appl. No. 16/407,265 on May 1, 2020.
Office Action issued in related Chinese Patent Application No. 201910640503.8, May 11, 2020.
Office Action of Philippine Pate1-2017-501299 corresponding to this U.S. Patent Application mailed Jul. 4, 2020 (4 pages).
Office Action issued in parent U.S. Appl. No. 17/716,406 om Nov. 28, 2022.
Notice of Allowance issued in parent U.S. Appl. No. 17/716,406 on May 19, 2023.
Notice of Allowance issued in the related U.S. Appl. No. 18/303,743, filed May 6, 2024.

INK-JET PRINTER

REFERENCE TO RELATED APPLICATIONS

The present application is a continuation of U.S. patent application Ser. No. 17/716,406, filed Apr. 8, 2022, now U.S. Pat. No. 11,760,102, which is a continuation of U.S. patent application Ser. No. 17/012,213, filed Sep. 4, 2020, now U.S. Pat. No. 11,298,948, which is a continuation of U.S. patent application Ser. No. 16/407,265, filed May 9, 2019, now U.S. Pat. No. 10,766,266, which is a continuation of U.S. patent application Ser. No. 15/845,001, filed Dec. 18, 2017, now U.S. Pat. No. 10,286,674, which is a continuation of U.S. patent application Ser. No. 15/293,585, filed Oct. 14, 2016, now U.S. Pat. No. 9,844,947, which is a continuation of U.S. patent application Ser. No. 15/000,545, filed Jan. 19, 2016, now U.S. Pat. No. 9,475,298, and further claims priorities from Japanese Patent Applications No. 2015-008172 filed on Jan. 19, 2015, and No. 2015-008173 filed on Jan. 19, 2015, the disclosures of all of which are incorporated herein by reference in their entireties.

BACKGROUND ART

Conventionally, there is known a liquid consuming apparatus such as an ink-jet printer which is provided with a tank configured to store liquid such as ink, and which is configured to consume the liquid stored in the tank. For example, conventionally, there is known an ink-jet printer provided with an accommodation case configured to accommodate a tank (storage container) configured to store ink, which is to be supplied via a liquid tube to a liquid discharge head (liquid-jet head) configured to consume the ink, separately from a casing configured to accommodate the liquid discharge head, wherein the accommodation case is detachably engaged with respect to the casing. An inlet (inlet port), formed in the tank, is provided with a cap which is to be removed when the ink is poured into the tank. A space or area located above the cap is covered by an upper cover arranged pivotably on an upper portion of the accommodation case. Then, when a user pours ink into the tank, the user firstly releases the upper cover so as to expose the cap to the outside, and then removes the cap from the inlet port, thereby releasing the inlet port. Afterwards, the user pours the ink into an ink chamber defined inside the tank, via the released inlet port.

DESCRIPTION

In a case that any vibration is externally applied to the liquid consuming apparatus as described above, for example, during transportation or the like, there is such a fear that the cap installed in the inlet port of the tank might be loosened and/or detached from the inlet port. Normally, the ink chamber when shipped from a factory, etc., is empty. Accordingly, in a distribution channel from the factory to the user, there is no fear that the ink might leak from the tank of the liquid consuming apparatus during the transportation thereof. However, in such a case that a liquid consuming apparatus, which has been used once, is transported to any destination, for example, as a returned product or due to any repair, etc., there is such a possibility that the ink remains in the ink chamber of the tank. If the cap installed in the inlet port of the tank in this case were loosened or detached from the inlet port, there is such a fear that the ink might leak from the tank.

Alternatively, in the liquid consuming apparatus as described above, the cap is left without being installed in the inlet port after pouring the ink into the tank, in some cases. Still alternatively, there is such a case that although the cap is once installed in the inlet port, the cap floats or inclines and thus the installment of the cap in the inlet port is not sufficient or is not appropriate, the tank and the cap are not appropriately sealed in some cases. In a case that the cap is not appropriately installed in the inlet port of the tank, as in the examples described above, the water-tightness between the tank and the cap is not secured, which in turn leads to such a fear that the ink might leak from the tank.

The present teaching has been made in view of the situations as described above. An object of the present teaching is to prevent the cap installed in the inlet port of the tank in the liquid consuming apparatus from being detached from the inlet port, for example, during the transportation of the liquid consuming apparatus, etc.

Further, another object of the present teaching is to provide, in a case that the cap is not appropriately installed in the inlet port of the tank, such a configuration capable of notifying the user of such a situation regarding the inappropriate attachment of the cap in the inlet port of the tank.

In a case that the liquid consuming apparatus is transported to its destination as a returned product, for any repair, etc., the liquid consuming apparatus is wrapped with a packing material, etc., so that any movable member including the tank cover is not moved during the transportation. In the liquid consuming apparatus in a packed state, the tank cover is normally fixed so that the tank cover is not moved from a closed state. The inventor of the present teaching arrived at restricting the movement of the cap installed in the tank, by using the tank cover.

According to an aspect of the present teaching, there is provided an ink-jet printer, including: an ink tank; a cap; and a cover. The ink tank includes an ink inlet. The cap is configured to seal the ink inlet. The cover is configured to be movable with respect to the ink inlet between a closed position at which the cover covers the ink inlet, and an open position at which the cover exposes the ink inlet. The cover includes an inner surface configured to face the ink inlet under a condition that the cover is in the closed position, and a rib provided at the inner surface. The rib is configured to face a part of the cap, in which the cap is sealed the ink inlet under the condition that the cover is in the closed position and the rib is configured to abut against the part of the cap under a condition that the cap is not appropriately sealed the inlet when the cover moving from the open position to the closed position, thereby the cover being prevented from reaching the closed position.

FIGS. 1A and 1B are perspective views each depicting an example of a multifunction peripheral having a printer function of an ink-jet system according to an embodiment of the present teaching, wherein FIG. 1A is a perspective view depicting a state that a cover is at a closed position, and FIG. 1B is a perspective view depicting a state that the cover is at an opened position.

Next, an embodiment of the present teaching will be explained with reference to the drawings. In the following embodiment, explanation will be given about a multifunction peripheral having a printer function (printer multifunction peripheral, hereinafter referred to also simply as "multifunction peripheral 10"), as an example of a liquid consuming apparatus. The concepts of up-down direction, front-rear direction and left-right direction in the documents of the present specification and the claims are deemed to be same as an up-down direction 7, a front-rear direction 8 and a left-right direction 9 in the multifunction peripheral 10 as depicted in FIGS. 1A and 1B.

<Overall Configuration of Multifunction Peripheral 10>

Figure 1A:
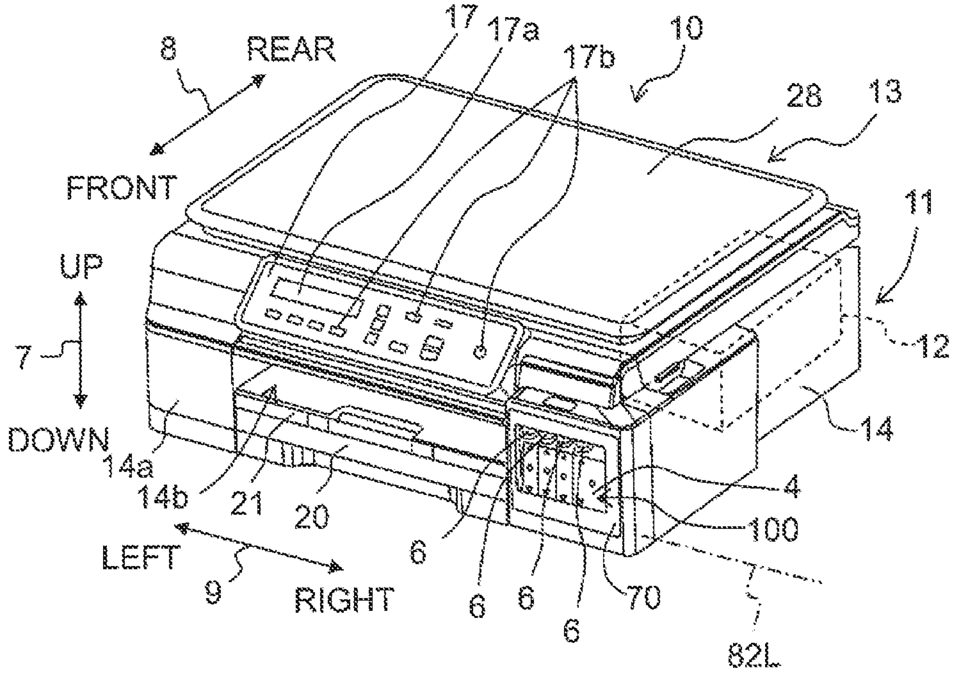
Figure 1B:
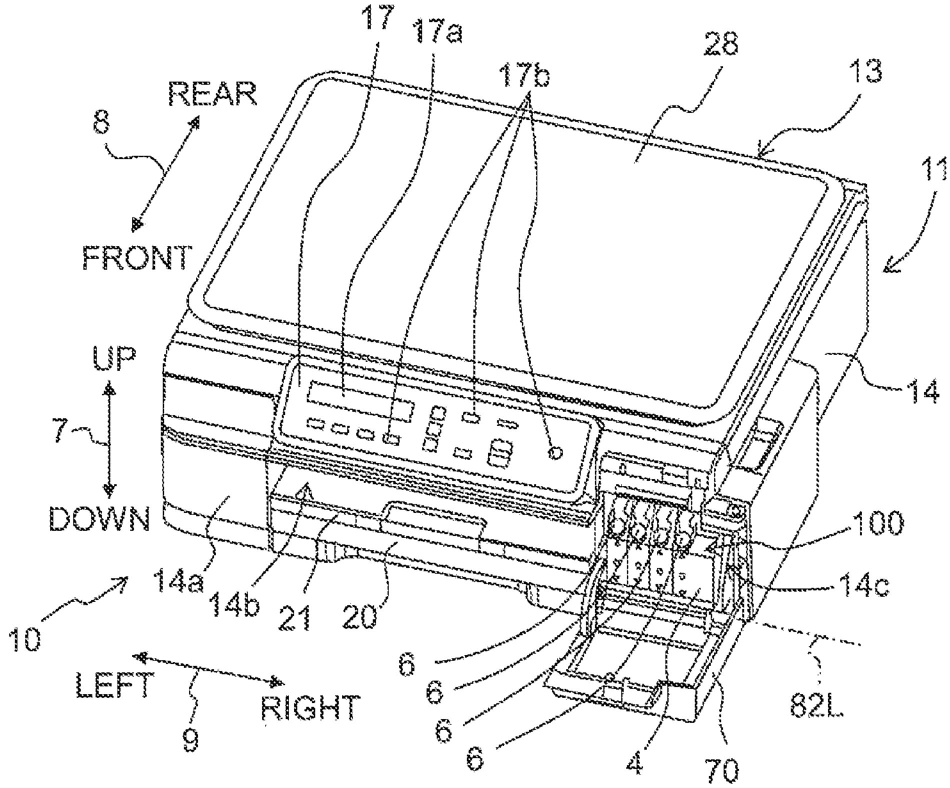

As depicted in FIGS. 1A and 1B, the multifunction peripheral 10 according to the present embodiment is formed to have a substantially rectangular parallelepiped shape as a whole, and is provided with a scanner unit 13 provided on an upper portion of the multifunction peripheral 10, a printer unit 11 provided on a lower portion of the multifunction peripheral 10, and a controller 12 configured to control the operation of the multifunction peripheral 10. The printer unit 11 is capable of forming an image on a paper sheet P (paper P; see FIG. 2) in an ink-jet recording system. In the multifunction peripheral 10 having the above-described configuration, the operations of the scanner unit 13 and the printer unit 11 are controlled by the controller 12, thereby allowing the multifunction peripheral 10 to exhibit a plurality of functions such as a copying machine, an ink-jet printer, an image scanner, a facsimile machine, etc.

The external shape of the multifunction peripheral 10 is substantially formed of a casing 14 having a rectangular parallelopiped shape, and a top cover 28 configured to cover an upper portion of the casing 14. An opening 14*b* is formed in the casing 14 on a front wall 14*a* at a substantially central portion thereof in the left-right direction 9, and a discharge tray 21 and a feeding tray 20 are arranged inside the opening 14*b*. Further, an operation panel 17 supported to be tiltable by the casing 14 is disposed at a location above the opening 14*b*. A liquid crystal display 17*a* as an output means from the controller 12, an input button 17*b* as an input means to the controller 12, etc., are provided on the display panel 17.

Furthermore, an opening 14*c* is provided on the front wall 14*a* of the casing 14, at a right portion thereof in the left-right direction 9, and the opening 14*c* is covered by the cover 70 which is openable/closable and which may form a portion of the front wall 14*a*. The cover 70 is rotatable between the closed position (FIG. 1A) at which the cover 70 covers the opening 14*c* and the opened position (FIG. 0.1B) at which the cover 70 allows the opening 14*c* to be exposed to the outside of the multifunction peripheral 10 (at which the cover 70 does not cover the opening 14*c*) (see FIG. 1B). The cover 70 will be described in detail later on.

<Printer Unit 11>

Figure 2:
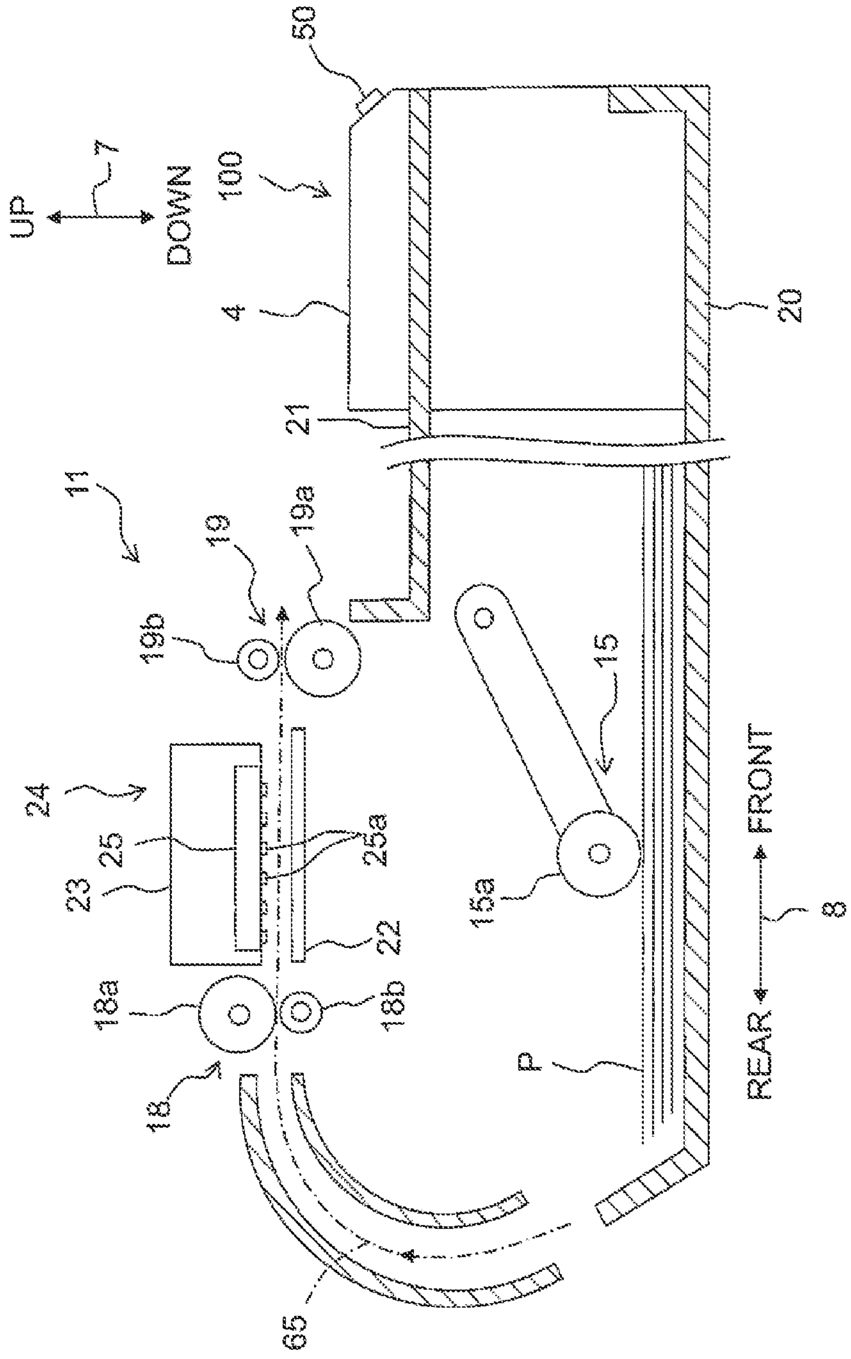
FIG. 2 is a vertical cross-sectional view schematically depicting the internal structure of a printer unit.

Next, the printer unit 11 will be explained in detail. FIG. 2 is a vertical cross-sectional view schematically depicting the overall structure of the printer unit 11. As depicted in FIG. 2, the printer unit 11 includes a feeding section 15, the feeding tray 20, the discharge tray 21, a conveyance roller section 18, a recording section 24, a discharge roller section 19, a platen 22, and a tank unit 100. These constituent elements of the printer unit 11 are accommodated inside the casing 14.

The feeding section 15 is provided with a feeding roller 15*a* which is urged by the self-weight or an elastic force by a spring, etc. toward a sheet or plurality of sheets of paper P accommodated in the feeding tray 20. By the rotation of the feeding roller 15*a*, the sheets of paper P accommodated in the feeding tray 20 are fed one by one to a conveyance route 65.

The conveyance route 65 is a route which extends upward from a rear end portion of the feeding tray 20 while making a U-turn forwardly, and then the conveyance route 65 reaches the discharge tray 21 via a space between the recording section 24 and the platen 22. The conveyance roller section 18, the recording section 24, and the discharge roller section 19 are arranged in this order from the upstream toward downstream along the conveyance route 65.

The conveyance roller section 18 includes a conveyance roller 18*a* and a pinch roller 18*b* which face each other in the up-down direction 7 with the conveyance route 65 interposed therebetween. The pinch roller 18*b* rotates following the rotation of the conveyance roller 18*a*. The paper P is fed toward the recording section 24 by being pinched between the conveyance roller 18*a* and the pinch roller 18*b*.

The recording section 24 is provided with the liquid discharging head 25, and a carriage 23 on which the liquid discharging head 25 is mounted. The recording section 24 is an example of the liquid consuming section. The recording section 24 is arranged to face the platen 22 in the up-down direction 7, with the conveyance route 65 interposed therebetween. Namely, the recording section 24 is arranged to be above the conveyance route 65 in the up-down direction 7, and to face the conveyance route 65. Note that the platen 22 is arranged to face the recording section 24 in the up-down direction 7, and the paper P conveyed by the conveyance roller section 18 is supported by the platen 22 from below.

The carriage 23 is provided with a guide rail extending in the left-right direction 9 and a carriage motor which causes the liquid discharging head 25 to reciprocate in the left-right direction 9 along the guide rail (both of the guide rail and the carriage motor are not depicted in the drawings). Further, a flexible flat cable, which electrically connects the liquid discharging head 25 with a control board having the controller 12 mounted thereon, is extended from the carriage 23 (the flexible flat cable is not depicted in the drawings). The flexible flat cable transmits a control signal output from the controller 12 to the liquid discharging head 25. Furthermore, an ink tube (not depicted in the drawings), which connects a tank 4 of the tank unit 100 with the liquid discharging head 25, is extended from the carriage 23. The ink tube supplies an ink stored in the tank 4 to the liquid discharging head 25. More specifically, four pieces of the ink tube via which inks of respective colors (black, magenta, cyan and yellow) flow are extended from the tank 4, and are connected to the carriage 23 in a bundled form.

The liquid discharging head 25 is an example of the liquid consuming apparatus. A plurality of nozzles 25*a* are formed in the lower surface of the liquid discharging head 25. The liquid discharging head 25 discharges the ink as minute ink droplets from the nozzles 25*a* toward the paper P supported by the platen 22 from below, thereby forming an image on the paper P.

The discharge roller section 19 includes a discharge roller 19*a* and a spur 19*b* which face each other in the up-down direction 7 with the conveyance route 65 interposed therebetween. The spur 19*b* rotates following the rotation of the discharge roller 19*a*. The paper P having the image formed thereon by the recording section 24 is fed toward the discharge tray 21 by being pinched between the discharge roller 19*a* and the spur 19*b*. Note that the feeding roller 15*a*, the conveyance roller 18*a* and the discharge roller 19*a* are driven by an unillustrated conveyance motor which is controlled by the controller 12.

The tank unit 100 is constructed of the tank 4 which accommodates the inks of respective colors, caps 6 which close inlet ports 50, respectively, formed in the tank 4. Although the tank unit 100 is accommodated inside the casing 14, when the cover 70 is opened, the front surface of the tank unit 100 is thereby exposed to the outside of the casing 14. Namely, when the cover 70 is opened, the caps 6 of the tank unit 100 become accessible via the opening 14*c* of the casing 14.

<Tank Unit 100>

Figure 3:
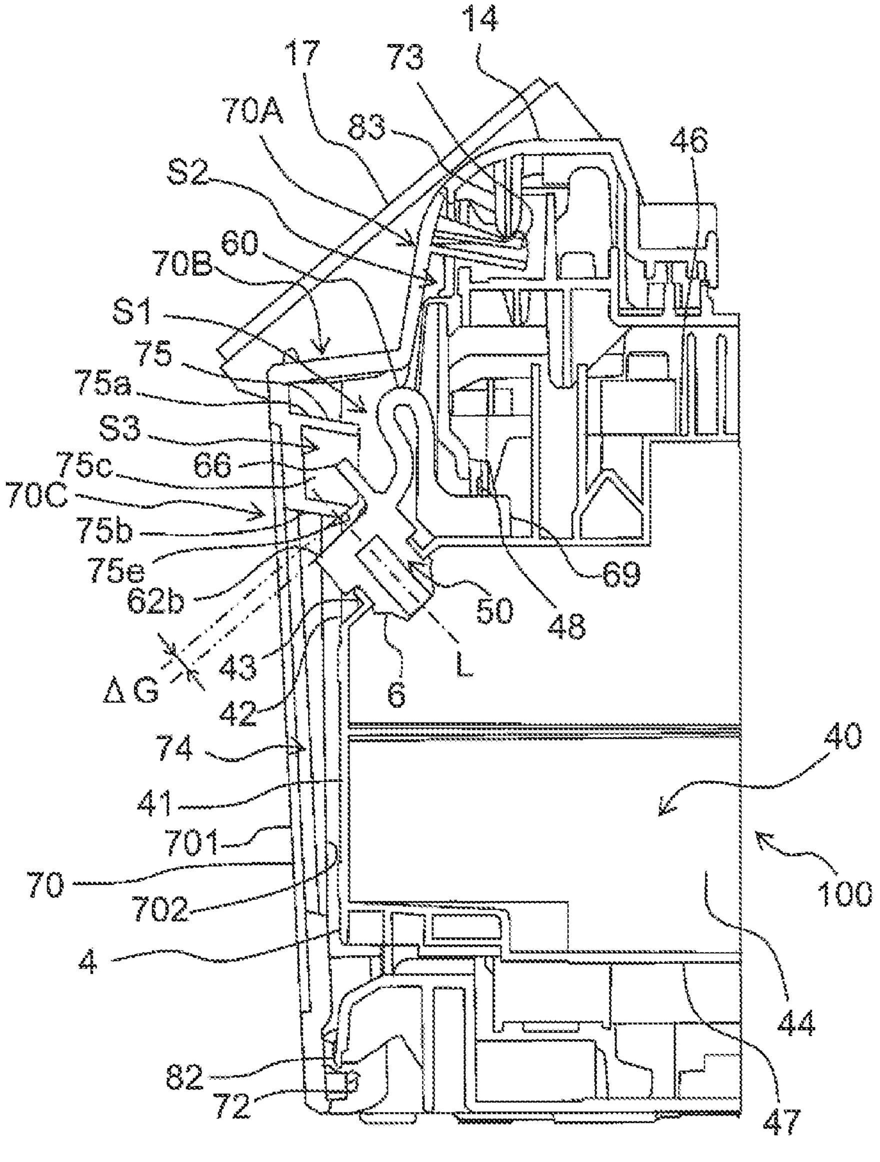
FIG. 3 is a vertical cross-sectional view partially depicting a state that the cover is in the closed position and that a cap is appropriately installed in an inlet port of a tank of a tank unit.
Figure 4:
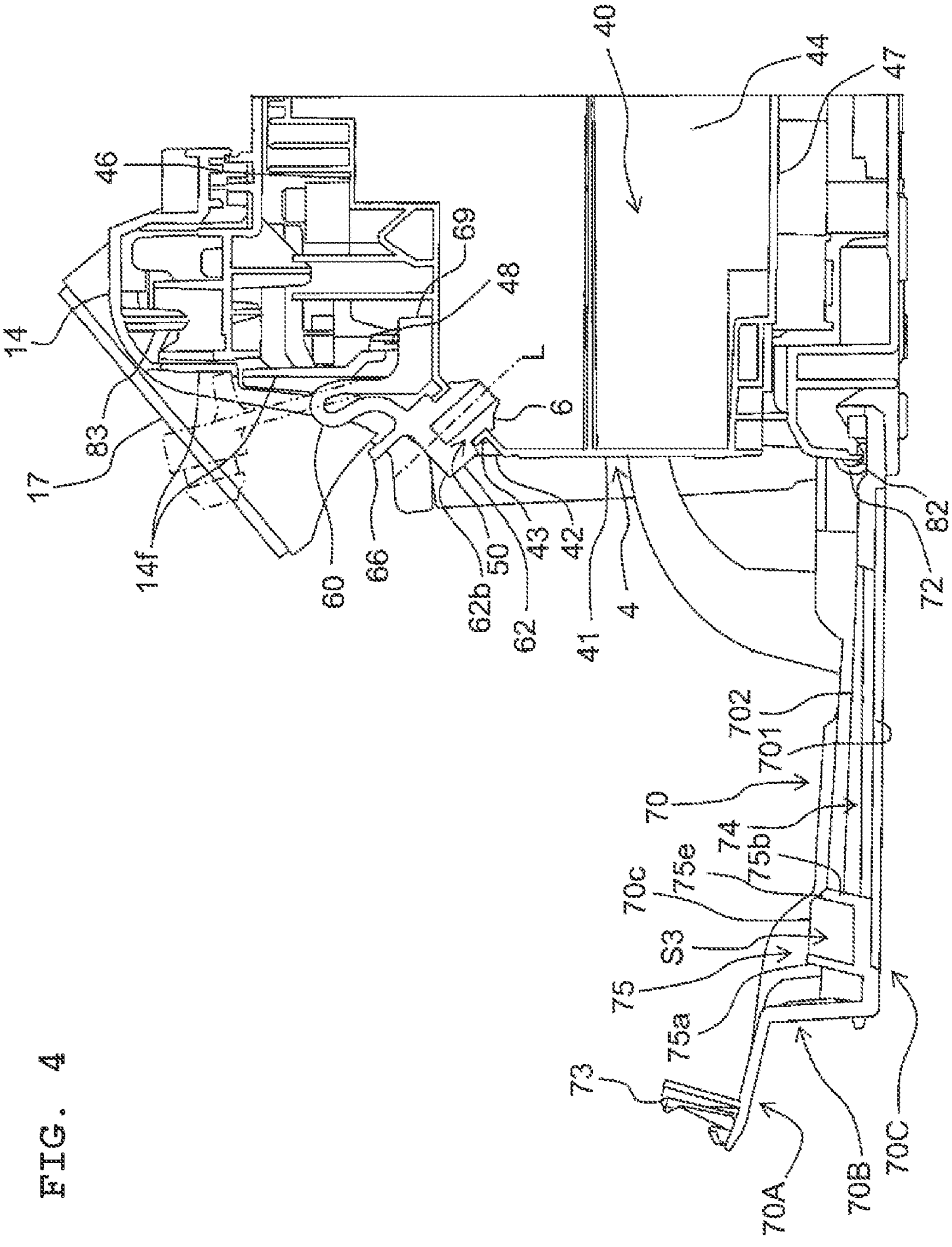
FIG. 4 is a vertical cross-sectional view partially depicting a state that the cover is in the opened position and that the cap is appropriately installed in the inlet port.
Figure 5:
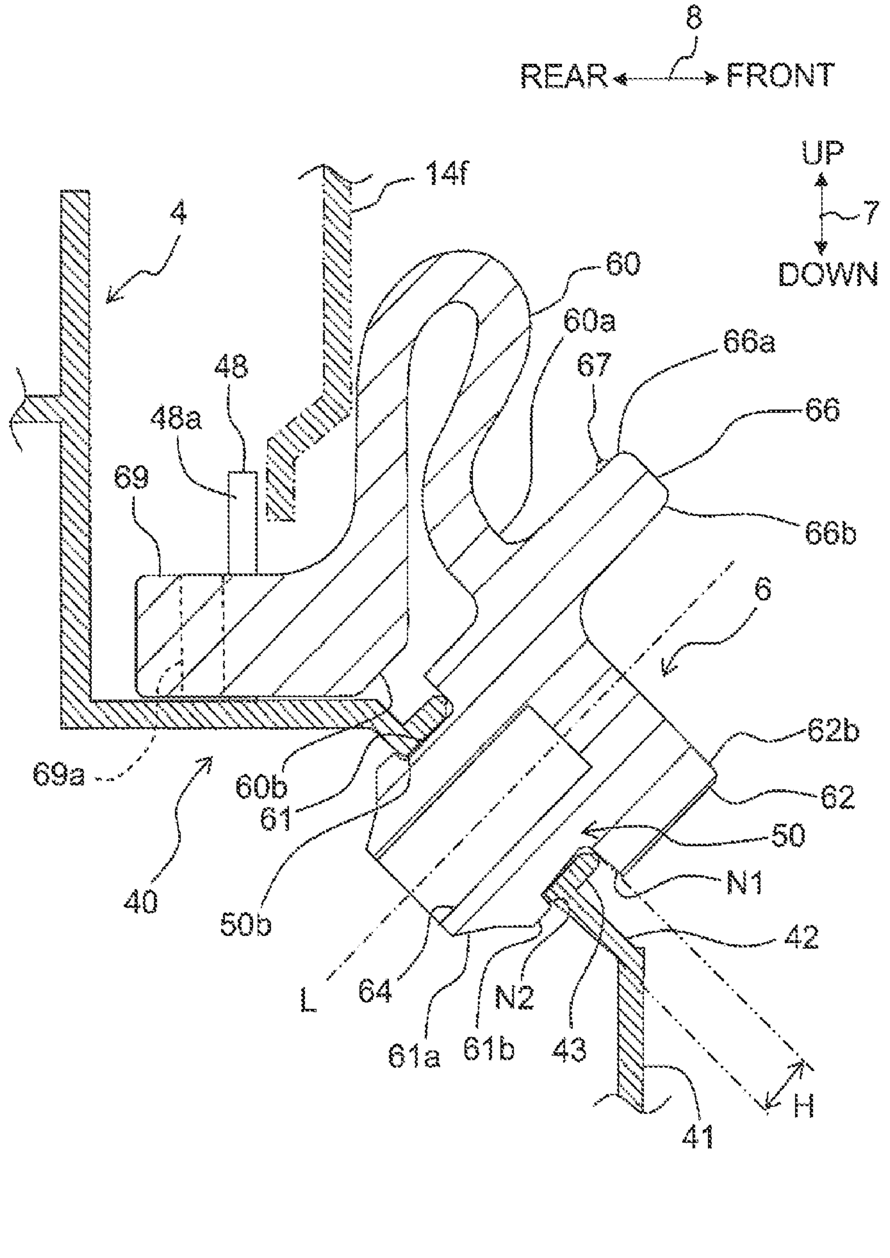
FIG. 5 is a vertical cross-sectional view of the multifunction peripheral partially depicting those in the vicinity of the inlet port of the tank of the tank unit.
Figure 6:
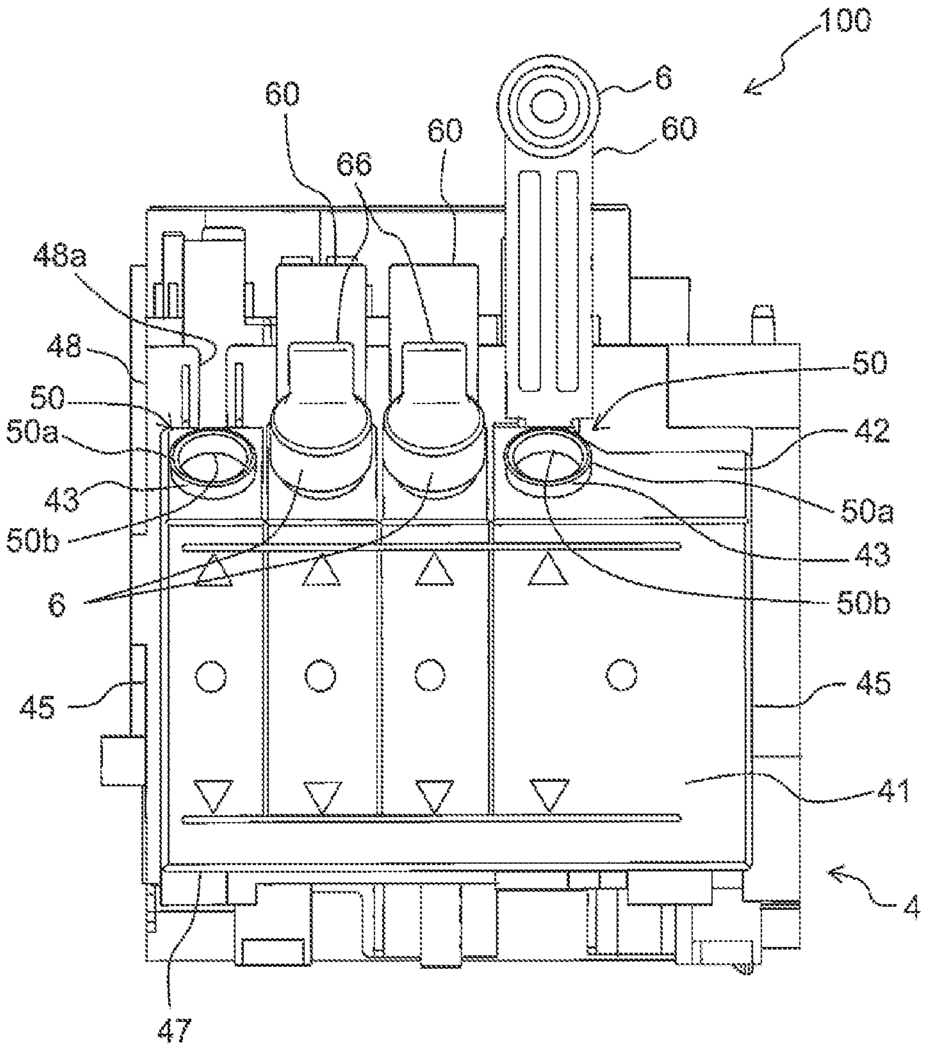
FIG. 6 is a front view of the tank unit.

Here, the tank unit 100 will be explained in detail. FIG. 3 is a partial cross-sectional view depicting the multifunction peripheral 10 in a state that the cover 70 is in the closed position and that each of the caps 6 is appropriately installed in one of the inlet ports 50 corresponding thereto (hereinafter referred to as a "normal state" in some cases). FIG. 4 is a partial cross-sectional view depicting the multifunction peripheral 10 in a state that the cover is in the opened position and that each of the caps 6 is appropriately installed in one of the inlet ports 50 corresponding thereto (hereinafter referred to as a "cover-opened state" in some cases). FIG. 5 is a partial vertical cross-sectional view depicting those in the vicinity of the inlet port 50 of the tank 4 of the tank unit 100. FIG. 6 is a front view of the tank unit 100. Note that in FIG. 4, the cap 6 and the arm 60 in a state of the multifunction peripheral 10 wherein the cover 70 is the opened position and a cap 6 is removed and the inlet port 50 is released (opened) (hereinafter referred to as a "cap-opened position") are depicted with two-dot chain lines. Note that in FIG. 6, one of four caps 6 is omitted to clearly depict the configuration of an arm connecting portion 48 disposed in the tank 4.

As depicted in FIGS. 3 to 6, the tank 4 has a wall formed with the inlet ports 50 via each of which the ink is poured into one of ink chambers 40 formed inside the tank 4. The tank 4 is formed to have an external shape that is substantially rectangular parallelepiped by a front wall 41 forming the front surface of the tank 4, two side walls 45 forming the both side surfaces in the left-right direction 9 of the tank 4, an upper wall 46 forming the upper surface of the tank 4, a bottom wall 47 forming the bottom surface of the tank 4, and an inclined wall 42 which is connected to the front wall 41 and the upper wall 46 and of which outer surface faces (is oriented to face) obliquely upward. Among these walls forming the ink chamber 40, at least the front wall 41 is a visually checking wall (see-through wall) that is transparent or semitransparent (translucent) so that an amount of the ink stored in the ink chamber 40 can be visually confirmed therethrough. A plurality of partition walls 44 are disposed between the left and right sides walls 45, and the internal space in the tank 4 is divided into a plurality of mutually independent ink chambers 40 by the partition walls 44. The rear surface of the tank 4 is sealed by a film 49 fused and adhered to rear end portions respectively of the partition walls 44, the side walls 45, the upper wall 46 and the bottom wall 47.

The internal space of the tank 4 is partitioned into four ink chambers 40 in the left-right direction 9. The black ink, cyan ink, magenta ink and yellow inks are stored in the four ink chambers 40, respectively. Each of the color inks is an example of the liquid. The number of the ink chamber 40 and the color of the ink are not limited to the above examples. Note that although the ink chambers 40 according to this embodiment are each formed of walls made of a resin, it is allowable that the ink chambers 40 are each formed of a bag made of a resin, etc.

The inlet ports 50 as openings configured to allow the inks to be poured into the ink chambers 40 respectively are disposed in the inclined wall 42 of the tank 4. The ink chambers 40 are communicated with the outside of the tank 4 via the inlet ports 50. The tank 4 according to the embodiment has the four ink chambers 40, and four inlet ports 50 are disposed in the inclined wall 42 as a row of inlet ports arranged side by side to one another (aligned) in the left-right direction 9, corresponding to the four ink chambers 40, respectively.

The tank 4 is provided with cylindrical walls 43 projecting obliquely upward from the outer surface of the inclined wall 42. Each of the inlet ports 50 is formed to penetrate through the inclined wall 42 and one of the cylindrical walls 43. In other words, each of the inlet ports 50 is defined by the wall portion(s) of the tank 4, namely, a portion of the inclined wall 42 and one of the cylindrical walls 43. The cylindrical wall 43 according to the embodiment is projected from the inclined wall 42 in a front upward direction that is non-orthogonal to the up-down direction 7 and oriented upward from the horizontal direction. Further, the cylindrical wall 43 is projected from the inclined wall 42 in a direction orthogonal to the outer surface of the inclined wall 42. An end portion 50*a* of the inlet port 50 is open toward the outside of the tank 4 while facing obliquely upward, at a projected end portion of the cylindrical wall 43. On the other hand, the other end portion 50*b* of the inlet port 50 is open in the inner surface of the inclined wall 42, while facing obliquely downward toward the ink chamber 40.

As described above, each of the inlet ports 50 disposed in the front surface of the tank 4 is exposed to the outside of the multifunction peripheral 10 via the opening 14*c* of the casing 14 under a condition that the cover 70 is at the opened position (see FIGS. 1B and 4). The caps 6 which are independent from each other are installed (attached to) the inlet ports 50, respectively. Each of the caps 6 is detachably attached to one of the inlet ports 50 and is capable of opening/closing one of the inlet ports 50. When each of the caps 6 is removed or detached from one of the inlet ports 50, the inlet port 50 is opened, thereby allowing the ink to be poured into the ink chamber 40 via the released (open) inlet port 50.

An arm 60 linking (joining, connecting) each of the caps 6 with the outer wall of the tank 4 or with the casing 14 is connected or joined to each of the caps 6. In the embodiment, the cap 6 and the arm 60 are integrally molded with an elastically deformable material such as rubber, elastomer, etc. Note that, however, the cap 6 and the arm 60 may be separately molded, and then may be connected to each other.

The cap 6 has a cap body (body) 61 and a flange 62 which are integrally formed. The body 61 is a portion which is inserted into the inlet port 50 and passes through the one end portion 50*a* of the inlet port 50 when the cap 6 is being installed in the inlet port 50. A forward end portion (tip portion) 61*a* of the body 61 reaches the inside of the ink chamber 40 in a state that the cap 6 is installed in the inlet port 50.

The body 61 has a cylindrical shape (columnar shape) wherein the outer diameter of the body 61 is substantially same as or greater to some extent than the inner diameter of the inlet port 50. A claw portion 61*b* is disposed in the body 61 at a portion thereof which is configured to be located inside the ink chamber 40 under the condition that the cap 6 is installed in the inlet port 50. The claw portion 61*b* is an annular-shaped projection projecting from the outer circumferential surface of the body 61 having the cylindrical shape in the radial direction, and the outer diameter of the claw portion 61*b* as the annular-shaped projection is greater than the inner diameter of the inlet port 50. Further, the forward end portion 61*a*, of the body 61, which is inserted into the inlet port 50 firstly among the body 61 when the cap 6 is being installed in the inlet port 50 has a tapered shape of which outer diameter is decreased toward the tip of the forward end portion 61*a*; the outer diameter of the forward end portion 61*a* (namely, the forward end portion of the body 61) is smaller than the inner diameter of the inlet port 50.

The flange 62 is a portion located at outside of the inlet port 50 and is not inserted into the inlet port 50, under the condition that the cap 6 is installed in the inlet port 50. The flange 62 has a cylindrical shape (columnar shape) of which outer diameter is greater than the inner diameter of the inlet port 50. The flange 62 is provided with an outer surface 62*b* facing the outside of the tank 4 and intersecting an opening central line L of the opening of the inlet port 50 under the condition that the cap 6 is installed in the inlet port 50. A tab 66 is projected from the outer surface 62*b*. The tab 66 is an operation projection held by a user with fingers, etc. so as to operate the cap 6 when the cap 6 is to be detached or removed from the inlet port 50 of the tank 4. The tab 66 is projected from the outer surface 62*b* of the flange 62, at a location shifted from the central portion of the outer surface 62*b*, rather than at the central location. The tab 66 according to the embodiment is projected from the outer surface 62*b*, of the flange 62, at a portion including the outer edge portion of the outer surface 62*b*.

The flange 62 has a nip surface N1 that is a reverse side of the outer surface 62*b*. A nip surface N2, which forms a pair of nip surfaces together with the nip surface N1, is provided on the claw portion 61*b* of the body 61. Under a condition that the cap 6 is in a natural state (namely, under a condition that the cap 6 is not elastically deformed), the two nip surfaces N1 and N2 face each other at a predetermined spacing distance (gap) therebetween. Namely, in the cap 6 in the natural state, the two nip surfaces N1 and N2 are separated from each other by a distance smaller to some extent than a length H (see FIG. 5), of the inlet port 50, in a direction that is parallel to the opening central line L of the inlet port 50.

The arm 60 is formed to have a substantially belt-shape extending from a peripheral portion of the flange 62. A forward end portion 60*a* of the arm 60 is connected to the peripheral portion of the flange 62 of the cap 6. Under a condition that the cap 6 and the arm 60 are in the natural state, an extension line extended from the forward end portion 60*a* of the arm 60 extends parallel to the outer surface 62*a* of the flange 62 of the cap 6.

An arm root 69 configured to support the arm 60 is integrally disposed at a basal portion 60*b* of the arm 60. The arm root 69 is projected rearward from the basal portion 60*b* of the arm 60. In the arm 60 in the natural state, the extending direction of the arm 60 and the extending direction of the arm root 69 are orthogonal to each other. The arm root 69 is provided with a lock piece 69*a* which is projected in a direction substantially orthogonal to the extending direction of the arm root 69.

The arm root 69 of the arm 60 is connected to the arm connecting portion 48 provided on the tank 4. The arm connecting portion 48 is a wall projecting upward from the upper wall 46 of the tank 4, at a location above and behind (rear of) the inlet port 50. The arm connecting portion 48 of the tank 4 is formed with a groove 48*a* extending in the up-down direction 7 (see FIGS. 5 and 6). As depicted in FIGS. 3 and 4, the arm root 69 is inserted into the groove 48*a* of the arm connecting portion 48, from above the groove 48*a*, so that the lock piece 69*a* is located behind the arm connecting portion 48. The arm root 69 is locked with respect to the arm connecting portion 48 by the lock piece 69*a* so that the arm root 69 is not dropped forwardly off from the groove 48*a* of the arm connecting portion 48. Further, a vertical wall 14*f* forming a portion of the casing 14 (or a portion of the frame of the multifunction peripheral 10) is present at a location above the arm root 69, and the vertical wall 14*f* prevents the arm root 69 from disengaging upwardly from the groove 48*a* of the arm connecting portion 48 of the tank 4.

<Attachment and Detachment of the Cap 6 with Respect to the Inlet Port 50 of the Tank 4>

In a case that the cap 6 is to be installed in the inlet port 50 of the tank 4, the body 61 of the cap 6 is pressed, by an user, into the inlet port 50 in a state that the forward end portion 61*a* of the body 61 of the cap 6 is positioned with respect to the one end portion 50*a* of the inlet port 50, until the flange 62 abuts against (makes contact with) the projected end portion of the cylindrical wall 43. In this situation, the user presses the outer surface 62*b* of the flange 62 with the inner surface of a finger, thereby allowing the body 61 to pass through the one end portion 50*a* of the inlet port 50 and to be pressed into the inlet port 50. When the claw portion 61*b*, of which outer diameter is compressed inside the inlet port 50, passes through the other end portion 50*b* of the inlet port 50 and reaches the inside of the ink chamber 40, the claw portion 61*b* is elastically recovered (elastically restored) and returns to its original shape.

As depicted in FIGS. 3 and 5, under the condition that the cap 6 is appropriately installed in the inlet port 50, the flange 62 is located outside the tank 4, the body 61 of the cap 6 is located inside the inlet port 50 and in the ink chamber 40, and the claw portion 61*b* and the forward end portion 61*a* of the body 61 have reached the ink chamber 40.

In a state that the cap 6 is installed in the inlet port 50 as described above, the nip surface N1 as the one of the nip surfaces of the cap 6 is pressed against the projected end portion of the cylindrical wall 43 defining the one end portion 50*a* of the inlet port 50, and the nip surface N2 as the other of the nip surfaces of the cap 6 is pressed against the inner surface of the inclined wall 42 defining the other end portion 50*b* of the inlet port 50. Further, the cap 6 is elastically deformed so that a distance between the nip surfaces N1 and N2 becomes substantially same as the length H, of the wall portion defining the opening 50, in the direction parallel to the opening central line L of the inlet port 50. With this, the cylindrical wall 43 and the inclined wall 42 are sandwiched and pressurized from both sides respectively with the two nip surfaces N1 and N2, due to the elastic deformation of the cap 6. In such a manner, the one end portion 50*a* of the inlet port 50 is sealed by the flange 62 of the cap 6, and the other end portion 50*b* of the inlet port 50 is sealed by the claw portion 61*b* of the cap 6 as well. Namely, in the state that the cap 6 is installed in the inlet port 50, the cap 6 and the tank 4 are sealed at two locations. Further, since the outer diameter of the portion, of the body 61, which is located inside the inlet port 50 is substantially same as or greater to some extent than the inner diameter of the inlet port 50, the body 61 makes tight contact with the wall portion, of the tank 4, defining the inlet port 50 (namely, makes tight contact with a surface defining the inlet port 50 in the cylindrical wall 43 and the inclined wall 42). With this, the inlet port 50 is sealed by the outer circumferential surface of the body 61.

Under the condition that the cap 6 is installed in the inlet port 50, the arm 60 is elastically deformed and bent. In this state, a restoring force, for restoring the arm 60 to return to a standing posture in which the arm 60 is standing upward (upright) with the forward end portion 60*a* of the arm 60 connected to the cap 6 being oriented upward as depicted in FIG. 4 with the two-dot chain lines, acts on the arm 60. However, the nip surface N2, among the two nip surfaces of the cap 6, which is provided on the claw portion 61*a* is caught (held) by the inner wall surface of the inclined wall 42 surrounding the other end portion 50*b* of the inlet port 50, thereby resisting the restoring force of the arm 60 for elastic recovery, which in turn results in maintaining the state that the cap 6 is installed in the inlet port 50.

In a case that the cap 6 installed in the inlet port 50 is to be removed (detached) from the inlet port 50, the body 61 of the cap 6 which in inserted into the inlet port 50 and into the ink chamber 40 of the tank 4 is pulled out to the outside of the tank 4 via the one end portion 50*a* of the inlet port 50. Here, the user touches a first surface 66*a* of the tab 66 with a finger, and touches a second surface 66*b* of the tab 66 with another finger, thereby holds the tab 66 of the cap 6 with the two fingers, and pulls the tab 66 obliquely upward, namely frontward and upward, or frontward (namely, toward the side in front of the user, toward the user), thereby making it possible to pull the body 61 of the cap 6 from the inlet port 50 of the tank 4 to the outside of the tank 4.

By removing the cap 6 from the inlet port 50 as described above, the arm 60 is substantially in a standing state in which the arm 60 is elastically restored and is standing upright due to the restoring force (cap-opened state). Accompanying with the standing action of the arm 60, the cap 6 connected to the forward end portion 60*a* of the arm 60 pivots or rotates upward about the basal portion 60*b* of the arm 60 as the rotational center. When the cap 6 is removed from the inlet port 50 in such a manner, the cap 6 is moved to and maintained at a position located above and apart from the inlet port 50.

<Cover 70>

Figure 7:
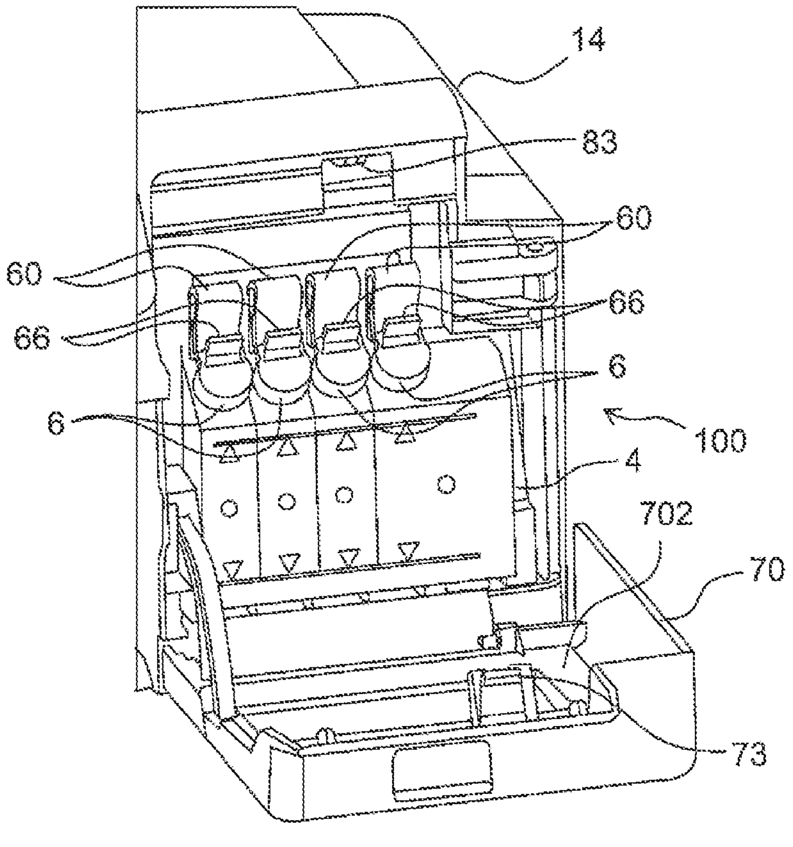
FIG. 7 is a partial perspective view of the multifunction peripheral, depicting the tank unit and the cover in the state that the cover is the opened position and the cap is appropriately installed in the inlet port.
Figure 8:
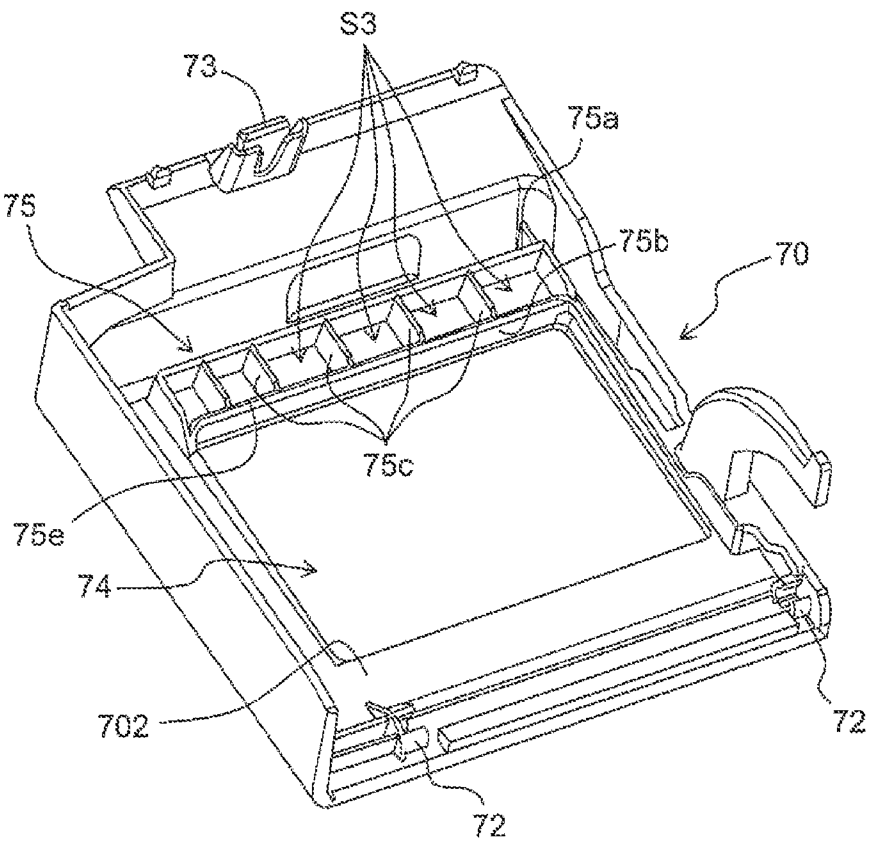
FIG. 8 is a perspective view of the cover.

Here, the cover 70 will be explained in detail. FIG. 7 is a partial perspective view depicting the tank unit 100 and the cover 70 of the multifunction peripheral 10 in a state that the cover 70 is the opened position and each of the caps 6 is appropriately installed in the inlet port 50. FIG. 8 is a perspective view of the cover 70. As depicted in FIGS. 1A, 1B, 3, 4, 7 and 8, the cover 70 is provided to be capable of opening/closing the opening 14*c* formed in the front wall 14*a* of the casing 14. The cover 70 rotates about a rotation axis 82L extending in a direction along (parallel to) a placement surface in which the multifunction peripheral 10 is placed, specifically extending in the left-right direction 9. In this embodiment, the casing 14 is provided with a rotation shaft 82 projecting from the casing 14 into the inside of the opening 14*c*. The rotation shaft 82 is disposed in the casing 14 so that the axis of the rotation shaft 82 is substantially coincident with the rotation axis 82L. A C-shaped bearing 72 integrally formed in a lower portion of the cover 70 is externally fitted to the rotation shaft 82. In this manner, the cover 70 is supported by the casing 14 to be rotatable about the rotation axis 82L extending in the left-right direction 9 and passing through the lower portion of the cover 70.

The cover 70 has an outer shape of which magnitude (size, extent) corresponds to the opening 14*c*, and has a box-shape in which a side of the opening 14*c* is opened. The cover 70 covers the front wall 41 and the inclined wall 42 of the tank 4 in a state that the cover 70 is located at the closed position. When the cover 70 is located at the closed position, the caps 6 of the tank unit 100 become inaccessible from the outside of the multifunction peripheral 10. When the cover 70 is located at the opened position, the cover 70 allows the front wall 41 and the inclined wall 42 of the tank 4 to be exposed to the outside of the casing 14. When the cover 70 is located at the opened position, the caps 6 of the tank unit 100 become accessible from the outside of the multifunction peripheral 10, via the opening 14*c* of the casing 14. Here, the term "accessible" or "access" means that the user can touch the cap(s) 6 for the attaching or detaching operation of the cap 6, an ink bottle is allowed to be inserted into the inlet port 50 for a replenishing operation for replenishing the ink chamber 40 with the ink.

The cover 70 has an outer surface 701 forming a portion of the front wall 14*a* of the casing 14 and an inner surface 702 facing the tank 4 under the condition that the cover 70 is located at the closed position. An engaging portion 73 projecting from the inner surface 702 toward the casing 14 is disposed at an upper end portion of the cover 70. The engaging portion 73 maintains the cover 70 at the closed position by engaging with an engagement-object portion 83 formed in the casing 14 in the vicinity of an upper end portion of the opening 14*c*.

A window 74 is formed in the cover 70 at a central portion thereof in the up-down direction 7 and the left-right direction 9 in the state that the cover 70 is located at the closed position. The window 74 allows light to transmit therethrough between the side of the outer surface 701 and the side of the inner surface 702 of the cover 70, and the window 74 is formed, for example, by fitting a material allowing a visible light to transmit therethrough into an opening formed in the cover 70. The window 74 has such a dimension or size that allows a portion located above the lower end of the front wall 41 and a portion located below the upper end of the inclined wall 42 of the tank 4 to be visually confirmable (visible) in the up-down direction 7 from the side of the front wall 14*a* of the casing 14, and that allows a portion of the front wall 41 which is different from the left end and the right end of the front wall 41 to be visually confirmable in the left-right direction 9 from the side of the front wall 14*a* of the casing 14. The user can visually confirm whether or not the caps 6 are installed in the inlet ports 50 provided on the inclined wall 42 of the casing 14, via the window 74.

The cover 70 has a first portion 70A formed with the engaging portion 73, a second portion 70B projecting frontward from the first portion 70A and having a holding portion (grasping portion) 80 for a user to hold or grasp when the user opens the cover 70, and a third portion 70C extending downward from the second portion 70B. The window 74 is included in the third portion 70C. A space S1 capable of accommodating the cap 6 and the arm 60 therein under the condition that the cover 70 is in the closed position is defined between the second portion 70B and the third portion 70 and the tank 4. On the other hand, the upper side of the space S1 is a narrow space which is not capable of accommodating the arm 60 therein under the condition that the cover 70 is in the closed position.

The inner surface 702 of the cover 70 is provided with a rib 75 (projection) projecting from the inner surface 702. The rib 75 is integrally formed with other portion of the cover 70. The rib 75 is located immediately above the window 74 in the third portion 70C of the cover 70. The rib 75 is projected in the space S1 from the inner surface 702 of the cover 70 toward the tank 4 under the condition that the cover 70 is in the closed position. The rib 75 has a function of preventing the cap 6 from detaching or being removed from the inlet port 50 under the condition that the cover is in the closed position, in addition to the original function as the rib to reinforce the plate-shaped cover 70.

The rib 75 has an upper rib 75*a* and a lower rib 75*b* which are continued (extending) in the left-right direction 9, and a plurality of vertical ribs 75*c* linking the upper and lower ribs 75*a* and 75*b*, and the rib 75 as a whole has a substantially lattice-like (or grid-like, ladder-like) shape when the cover 70 is seen from the side of the inner surface 702.

Figure 11:
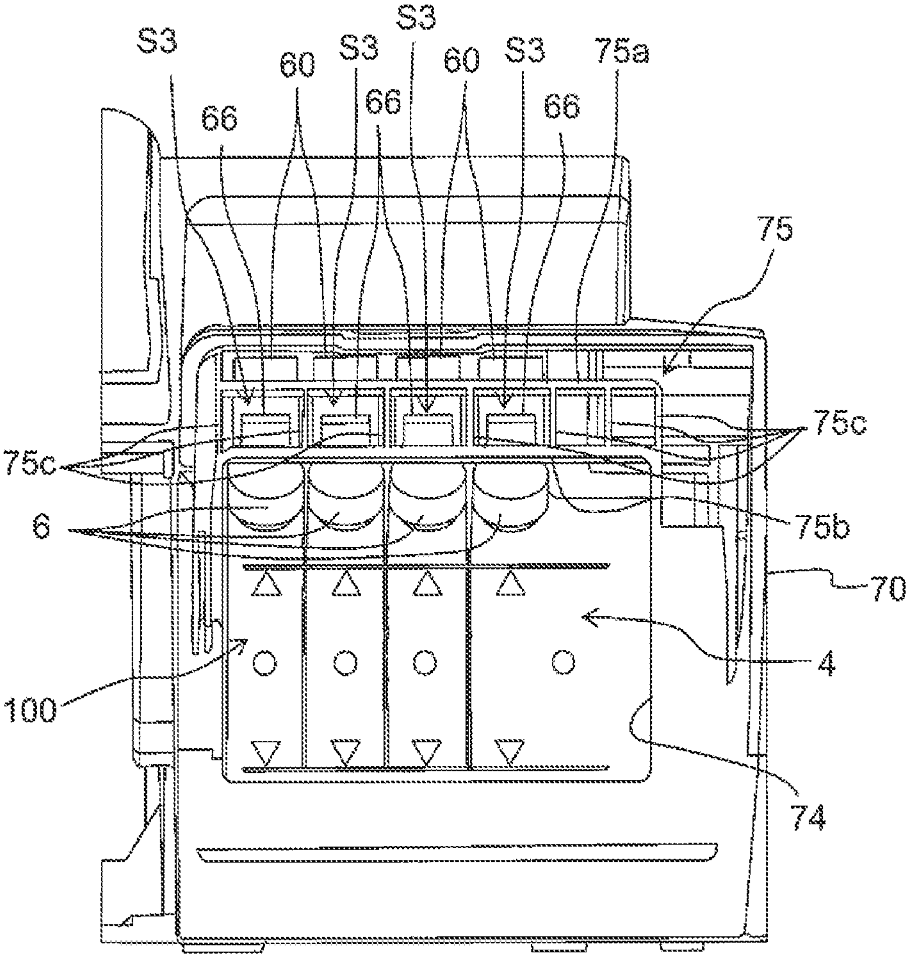
FIG. 11 is a view explaining the relationship between a rib provided on the cover and the cap appropriately installed in the inlet port of the tank.

As depicted in FIGS. 3 and 11, under the condition that the multifunction peripheral 10 is in the normal state (namely, in the state that the cover 70 is in the closed position and that the caps 6 are appropriately installed in the inlet ports 50), at least a portion of the tab 66 of each of the caps 6 is located at a position between the upper rib 75*a* and the lower rib 75*b* and between adjacent vertical ribs 75*c*, among the plurality of vertical ribs 75*c*, which are adjacent in the left-right direction 9. Namely, under the condition that the multifunction peripheral 10 is in the normal state, the upper rib 75*a*, the lower rib 75*b* and the adjacent vertical ribs 75*c* surround the tab 66 (surround a periphery or circumference portion of the tab 66) and define a space S3 into which at least a portion of the tab 66 is inserted.

When the multifunction peripheral 10 is in the normal state as described above, the tab 66 is located in the space S3 defined by the rib 75, and the cap 6 including the tab 66 does not contact the rib 75. Further, when the multifunction peripheral 10 is in the normal state, the arm 60 connected to the cap 6 does not contact the rib 75. If such a configuration were provided wherein the cap 6 and/or the arm 60 were designed to contact the rib 75 when the multifunction peripheral 10 is in the normal state, the cover 70 pressing the cap 6 and/or the arm 60 is easily opened by receiving the reaction force from the cap 6 and/or the arm 60. Accordingly, it is desired that the rib 75 does not contact any one of the cap 6 and the arm 60 when the multifunction peripheral 10 is in the normal state.

Further, under the condition that the multifunction peripheral 10 is in the normal state, a forward end portion of the lower rib 75*b* faces the outer surface 62*b* of the flange 62 of the cap 6, at a predetermined spacing distance ΔG in a direction parallel to the insertion direction (insertion-removal direction) in which the cap 6 is inserted into or removed from the inlet port 50. The forward end portion of the lower rib 75*b* is a pressing portion 75*e* which is configured to abut against (contact) the outer surface 62*a* of the flange 62 of the cap 6 so as to press the cap 6 and to thereby prevent the cap 6 from being removed or detached from the inlet port 50. The pressing portion 75*e* abuts firstly against (makes contact firstly with) the outer surface 62*b* of the flange 62 of the cap 6, among other portion(s) of the cap 6 different from the outer surface 62*b*, under a condition that the cap is moved, in the multifunction peripheral 10 in the normal state, in the insertion direction for allowing the cap 6 to be removed (separated and away) from the inlet port 50. Therefore, among the portions included in or forming the cap 6, there is not anything interposed between the pressing portion 75*e* and the outer surface 62*b* of the flange 62.

Further, it is preferable that the pressing portion 75*e* of the rib 75 is located on an extension of the opening central line L of the opening of the inlet port 50 under the condition that the multifunction peripheral 10 is in the normal state. With this, when the cap 6 is moved, in the multifunction peripheral 10 in the normal state, in the insertion direction for allowing the cap 6 to be removed from the inlet port 50, the pressing portion 75*e* consequently abuts against the outer surface 62*b* of the flange 62 at the point of intersection of the opening central line L with the outer surface 62*b*, thereby allowing the pressing portion 75*e* to press the cap 6 in a well-balanced manner.

In the embodiment, the insertion direction of the cap 6 is parallel to the extending direction of the opening central line L of the inlet port 50. Note that the term "opening central line L" of the inlet port 50 indicates a line linking the center of the one end portion 50*a* of the inlet port 50 and the center of the other end portion 50*b* of the inlet port 50, and an extension of this line. In the embodiment, the opening central line L is parallel to a projecting direction in which the cylindrical wall 43 is projected from the inclined wall 42. Further, the opening central line L can be considered also as being parallel to a penetrating direction in which the inlet port 50 penetrates through the cylindrical wall 43 and the inclined wall 42. Furthermore, the extending direction of the opening central line L of the inlet port 50 is parallel to the insertion direction in which the body 61 of the cap 6 is inserted into or removed from the inlet port 50.

In the above-described configuration, the term "predetermined spacing distance ΔG" has magnitude (size, extent) which is not more than a value within a range of a moving amount of the cap 6 by which water-tightness between the tank 4 and the cap 6 is maintained under the condition that the cap 6 installed in the inlet port 50 is moved, in the multifunction peripheral 10 in the normal state, in the insertion direction for allowing the cap 6 to be removed from the inlet port 50. Such a predetermined spacing distance ΔG is determined based on the relationship between the cap 6 and the wall portion defining the inlet port 50 (the inclined wall 42 and the cylindrical wall 43). It is preferable, however, that the predetermined spacing distance ΔG is a small value in order to prevent the size of the casing 14 from becoming large. In the cap 6 according to the embodiment, when the body 61 of the cap 6 is moved in the insertion direction for allowing the cap 6 to be removed from the inlet port 50, the claw portion 61*b* enters into the inside of the inlet port 50. In a state that the claw portion 61*b* is inside the inlet port 50, the outer circumferential surface of the body 61 is brought into pressurized contact with the outer circumferential (outer circumferential surface) of the claw portion 61*b* and the inner wall of the cylindrical wall 43, which in turn ensures the water-tightness between the tank 4 and the cap 6. Accordingly, in this embodiment, a preferred example of the magnitude of the predetermined spacing distance ΔG includes, for example, a length, of the wall portion defining the inlet port 50 (the inclined wall 42 and the cylindrical wall 43), in a direction parallel to the extending direction in which the opening central line L of the opening of the inlet port 50 is extended, namely, a length, of the inlet port 50, in a direction parallel to the extending direction of the opening central line L of the opening of the inlet port 50.

Figure 9:
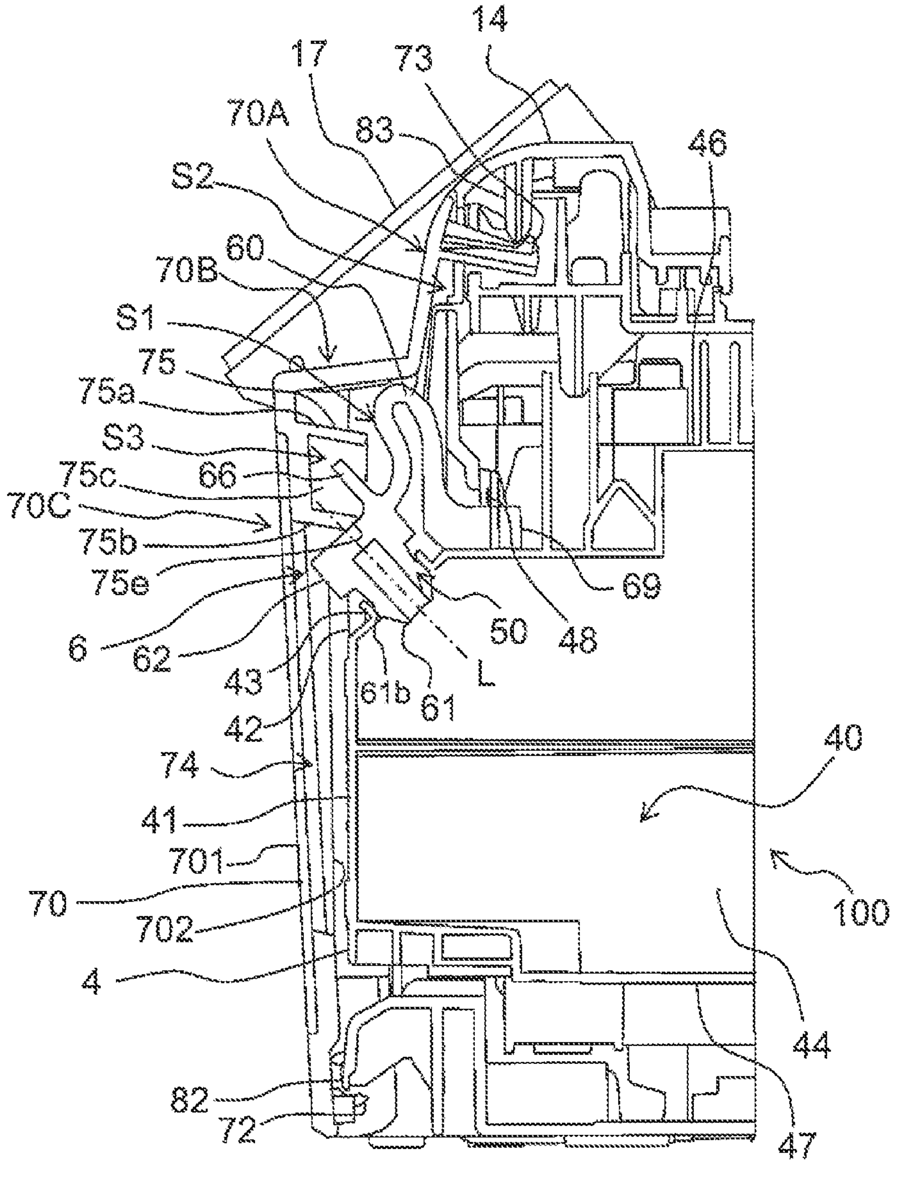
FIG. 9 is a partial vertical cross-sectional view of the multifunction peripheral in a state that the cover is in the closed position and the cap installed in the inlet port is moved in an insertion direction in which the cap is inserted into or removed from the inlet port.

FIG. 9 is a partial vertical cross-sectional view of the multifunction peripheral 10 in a state that the cover 70 is in the closed position and the cap 6 installed in the inlet port 50 is moved in the insertion direction of the cap 6 (moved in the direction parallel to the opening central line L) for allowing the cap 6 to be removed from the inlet port 50. As depicted in FIG. 3, when the cap 6 is appropriately installed in the inlet port 50 in the multifunction peripheral 10 in the normal state, the surface of the pressing portion 75*e* and the outer surface 62*b* of the flange 62 of the cap 6 are substantially parallel to each other. When the cap 6 is moved in the insertion direction for allowing the cap 6 to be removed from the inlet port 50, then as depicted in FIG. 9, the outer surface 62*b* of the flange 62 of the cap 6 abuts against the pressing portion 75*e* provided on the lower rib 75*b* of the rib 75, thereby restricting any further movement of the cap 6. In a state that the outer surface 62*b* of the flange 62 of the cap 6 abuts against the pressing portion 75*e* of the rib 75, the claw portion 61*b* of the body 61 of the cap 6 enters into the inside of the inlet port 50, thereby bringing the outer circumferential surface of the claw portion 61*b* into pressurized contact with the inner surface of the cylindrical wall 43, which in turn ensures the water-tightness between the tank 4 and the cap 6. Thus, when the cover 70 is in the closed position in the above-described manner, satisfactory water-tightness can be maintained between the cap 6 and the tank 4. Further, in a case that the cap 6 is moved in the insertion direction for allowing the cap 6 to be removed from the inlet port 50 along the opening central line L to thereby cause the outer surface 62*b* to abut against the pressing portion 75*e* as depicted in FIG. 9, the surface of the pressing portion 75*e* and the outer surface 62*b* of the flange 62 of the cap 6 are substantially parallel to each other. Accordingly, the cap 6 can be pressed by the surface of the pressing portion 75*e* in a well-balanced manner.

<Pouring of the Ink into the Tank 4>

When the multifunction peripheral 10 having the above-described configuration is in a state that the multifunction peripheral 10 can be used (usable state), the cover 70 is in the closed position and the caps 6 are appropriately installed in the inlet ports 50, respectively, of the tank 4, and the inlet ports 50 are sealed by the caps 6, respectively, as depicted in FIGS. 1A and 3. Namely, the usable state that the multifunction peripheral 10 can be used is the above-described normal state. When the ink is to be poured into the ink chamber 40 of the tank 4 of the multifunction peripheral 10, the user firstly rotates the cover 70 from the closed position to the opened position. By doing so, the multifunction peripheral 10 which has been in the normal state is allowed to have the cover-opened state by which the cap(s) 6 of the tank 4 can be accessible via the opening 14*c* of the front wall 14*a* of the casing 14, as depicted in FIGS. 4 and 7.

After allowing the multifunction peripheral 10 to have the cover-opened state, the user then removes a cap 6, among the caps 6, corresponding to an ink chamber 40, among the ink chambers 40, which is to be replenished with the ink. With this, the multifunction peripheral 10 which has been in the cover-opened state is allowed to have the cap-opened state in which the arm 60 is allowed to stand substantially upright and the cap 6 connected to the forward end portion of the arm 60 is maintained at a position apart (away) from the inlet port 50, as depicted in FIG. 4 with the two-dot chain lines. In detail, when the cap 6 is removed from the inlet port 50, the arm 60 which has been bent by the elastic deformation is elastically recovered by the recovering force to have a state that the arm 60 stands substantially upright. Accompanying with the standing action of the arm 60, the cap 6 connected to the forward end portion 60*a* of the arm 60 pivots or rotates upward about the basal portion 60*b* of the arm 60 as the rotational center. When the cap 6 is removed from the inlet port 50 in such a manner, the cap 6 is moved to and maintained at a position located above and apart from the inlet port 50.

Then, the user inserts a nozzle of an ink bottle (not depicted in the drawings) into the opened (released) inlet port 50 from which the cap 6 has been removed, and pours the ink inside the ink bottle into the ink chamber 40 via the inlet port 50. After finishing the pouring of the ink into the ink chamber 40, the user attaches (installs) the cap 6 in the inlet port 50, thereby sealing the inlet port 50. Afterwards, the user rotates the cover 70 from the opened position to the closed position.

There is assumed such a case that the inlet port 50 is not sealed by the cap 6 after the user has poured the ink into the ink chamber 40, and that the user attempts to rotate the cover 70 from the opened position to the closed position.

Figure 10:
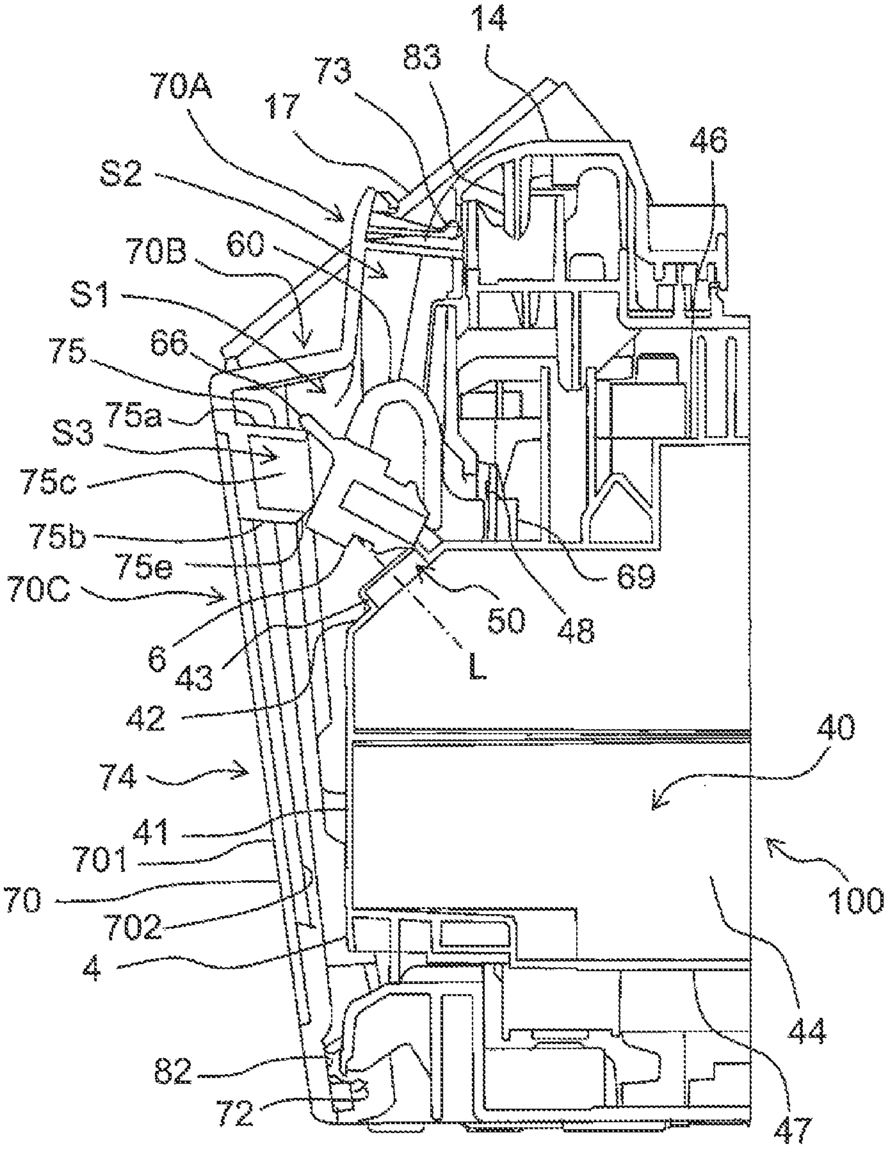
FIG. 10 is a partial vertical cross-sectional view of the multifunction peripheral in a state that the cap is not appropriately installed in the inlet port during a process in which the cover is moved from the opened position toward the closed position.
Figure 12:
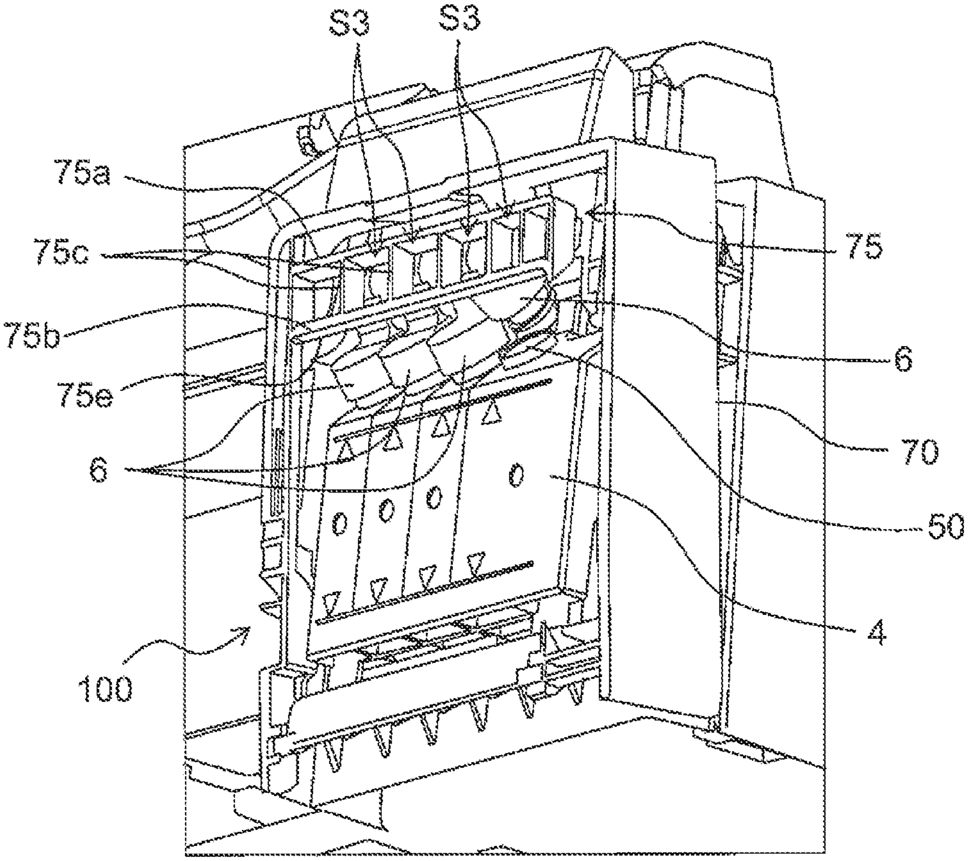
FIG. 12 is a view explaining the relationship between the rib provided on the cover and the cap which is not appropriately installed in the inlet port of the tank.

An example of the case that the inlet port 50 is not sealed by the cap 6 includes, for example, such a case that the arm 60 stands upright and the cap 6 is maintained at a position located above the inlet port 50, a case that the cap 6 is not appropriately installed in the inlet port 50 as depicted in FIGS. 10 and 12, and the like. Note that FIG. 10 is a partial vertical cross-sectional view of the multifunction peripheral 10 in a state that the cap 6 is not appropriately installed in the inlet port 50 during a process in which the cover 70 is moved from the opened position to the closed position; and FIG. 12 is a view explaining the relationship between the rib 75 which is provided on the cover 70 and the cap 6 which is not appropriately installed in the inlet port 50 of the tank 4. In the case that the cap 6 is not appropriately installed in the inlet port 50, the cap 6 is not inserted deeply enough for allowing the claw portion 61*b* of the body 61 to reach the ink chamber 40 and includes, for example, such a state that the cap 6 is floated from the inlet port 50, and such a state that the arm 60 is bent and that the cap 6 is present in the vicinity of the inlet port 50 but the cap 6 is detached (removed) from the inlet port 50, and the like.

Since a space S2 which is defined between the first portion 70A of the cover 70 and the casing 14 is narrower than the space S1 which is defined among the second portion 70B and the third portion 70C of the cover 70 and the casing 14, the cap 6 cannot be accommodated in the space S2. Accordingly, in the case that the arm 60 stands upright and the cap 6 is maintained at the position located above the inlet port 50 and that the cover is caused to rotate from the opened position toward the closed position, the movement of the cover 70 is hindered or prevented by the arm 60 (or by the cap 6) and thus the cover 70 cannot reach the closed position. In other words, before the cover 70 reaches the closed position, the inner surface 702 of the cover 70 makes contact with the arm 60 (or with the cap 6), thereby restricting any further upward movement of the cover 70, which in turn prevents the cover 70 from reaching the closed position.

Further, in the case that the cap 6 is not appropriately installed in the inlet port 50, the rib 75 provided on the inner surface 702 of the cover 70 interferes with the cap 6 and/or the arm 60, as depicted in FIGS. 10 and 12. Note that in the example depicted in FIG. 10, the upper rib 75*a*, among the rib 75, interferes with the cap 6 which is displaced upward in the liquid consuming apparatus in the normal state; and in the example depicted in FIG. 12, the vertical rib(s) 75*c*, among the rib 75, interfere(s) with the tab 66 or the flange 62 of the cap 6 which is displaced in the left-right direction 9 in the liquid consuming apparatus in the normal state.

In the multifunction peripheral 10 in the normal state, the space S1 defined by the second portion 70B and the third portion 70C of the cover 70, the casing 14 and the tank 4 is capable of accommodating only the caps 6 which are appropriately installed in the inlet ports 50. Therefore, in a case that the cover 70 is made to rotate from the opened position toward the closed position in a state that the cap(s) 6 is (are) not appropriately installed in the inlet port(s) 50, the movement of the cover 70 is hindered by the cap(s) 6 and/or the arm(s) 60 intervening between the cover 70 and the tank 4, thereby preventing the cover 70 from reaching the closed position. More specifically, before the cover 7 reaches the closed position, the rib 75 of the inner surface 702 of the cover 70 contacts the cap(s) 6 and/or the arm(s) 60, which in turn restricts any further upward movement of the cover 70, thereby preventing the cover 70 to reach the closed position, namely, thereby making it impossible to close the cover 70.

As explained above, the multifunction peripheral 10 as the liquid consuming apparatus according to the embodiment is provided with the recording section 24 as the liquid consuming section; the tank 4 having the ink chamber 40 as the liquid storage chamber which is configured to store the ink (liquid), to be consumed by the recording section 24, therein, and the inlet ports 50 which are formed in the tank 4 and via which the liquid is poured into the ink chambers 40, respectively; the caps 6 which are detachably attached to the inlet ports 50 and which are capable of opening/closing the inlet ports 50, respectively; and the casing 14 having the cover 70 which is movable with respect to the tank 4 between the closed position at which the cover 70 covers the surface, of the tank 4, in which the inlet ports 50 are formed and the opened position at which the cover 70 allows the surface, of the tank 4, in which the inlet ports 50 are formed to be exposed to the outside, and the casing 14 being configured to accommodate the recording section 24, the tank 4 and the caps 6 therein. Each of the caps 6 has the outer surface 62*b* facing the outside of the tank 4 and intersecting the opening central line L of the opening of one of the inlet ports 50 corresponding thereto, under the condition that the caps 6 are installed in the inlet ports 50. The cover 70 has the inner surface 702 facing the surface, of the tank, formed with the inlet ports 50, and the rib 75 as the projection projecting from the inner surface 702 toward the tank 4. Further, the rib 75 of the cover 70 is provided with the pressing portion 75*e* configured to face the outer surface 62*b* of each of the caps 6 at the predetermined spacing distance ΔG in the direction parallel to the insertion direction, in which the cap 6 is inserted into or removed from the inlet port 50, under the condition that the multifunction peripheral 10 is in the normal state in which the cover 70 is in the closed position and that the caps 6 are installed respectively in the inlet ports 50, and the pressing portion 75*e* is configured to abut firstly against (makes contact firstly with) the outer surface 62*b*, among the other portion(s) of the cap 6 different from the outer surface 62*b*, under the condition that the cap 6 is moved, in the multifunction peripheral 10 in the normal state, in the insertion direction for allowing the cap 6 to be removed from the inlet port 50.

With this, under the condition that the cap 6 is moved, in the liquid consuming apparatus in the normal state, in the insertion direction for allowing the cap 6 to be removed from the inlet port 50, the outer surface 62*b* of the cap 6 and the pressing portion 75*e* of the rib 75 of the cover 70 abut against each other to thereby restrict any further movement of the cap 6 in the insertion direction for allowing the cap 6 to be removed from the inlet port 50. Thus, in a state that the cover 70 is in the closed position, namely, in a state that the cover 70 is closed, the movement of the cap 6, which is installed in the inlet port 50 of the tank 4, in the insertion direction for allowing the cap 6 to be removed from the inlet port 50 (in a direction for allowing the cap 6 to be removed from the inlet port 50) is suppressed (restricted), thereby making it possible to prevent the cap 6 installed in the inlet port 50 of the tank 4 from being removed (detached) from the inlet port 50.

Further, in the multifunction peripheral 10 of the embodiment, the extent or magnitude of the "predetermined spacing distance ΔG" is not more than a value within a range of the moving amount of the cap 6 by which water-tightness between the tank 4 and cap 6 is maintained under the condition that the cap 6 appropriately installed in the inlet port 50 is moved, in the multifunction peripheral 10 in the normal state, in the insertion direction for allowing the cap 6 to be removed from the inlet port 50.

With this, even when the cap 6 appropriately installed in the inlet port 50 is moved in the insertion direction for allowing the cap 6 to be removed from the inlet port 50 in a state that the cover 70 is in the closed position, namely that the cover 70 is closed, such movement of the cap 6 is restricted within the range of the moving amount of the cap 6 by which water-tightness between the tank 4 and cap 6 is maintained. With this, it is possible to prevent the ink from leaking out of the inlet port 50 of the tank 4 when the cover 70 is in the closed position, namely when the cover 70 is closed.

Furthermore, in the multifunction peripheral 10 of the present embodiment, the tank 4 has the wall portion defining the inlet port 50 (the cylindrical wall 43 and the inclined wall 42), and the cap 6 has the claw portion 61*b* configured to be located inside the ink chamber 40 and to engage with the opening edge, of the wall portion defining the inlet port 50, on the side of the ink chamber 40 under the condition that the cap 6 is installed in the inlet port 50. Moreover, the magnitude (size, extent) of the predetermined spacing distance ΔG between the forward end portion of the lower rib 75*b* (namely, the pressing portion 75*e*) and the outer surface 62*b* of the flange 62 of the cap 6 has a value corresponding to the length, of the wall portion defining the inlet port 50, in the direction parallel to the extending direction in which the opening central line L of the opening of the inlet port 50 is extended.

With this, even when the cap 6 appropriately installed in the inlet port 50 of the tank 4 is moved (is caused to move) in the insertion direction for allowing the cap 6 to be removed from the inlet port 50 in the state that the cover 70 is in the closed position, namely that the cover 70 is closed, such movement of the cap 6 is restricted within the range of the moving amount of the cap 6 by which water-tightness between the tank 4 and cap 6 is maintained. With this, it is possible to prevent the ink from leaking out of the inlet port 50 of the tank 4 when the cover 70 is in the closed position, namely when the cover 70 is closed.

Further, in the multifunction peripheral 10 of the embodiment, the pressing portion 75*e* of the rib 75 is located on the extension of the opening central line L of the opening of the inlet port 50 under the condition that the multifunction peripheral 10 is in the normal state.

With this, when the cap 6 appropriately installed in the inlet port 50 of the tank 4 is moved in the insertion direction for allowing the cap 6 to be removed from the inlet port 50, the pressing portion 75*e* of the rib 75 abuts against the outer surface 62*b* of the flange 62 of the cap 6 at the point of intersection of the opening central line L of the inlet port 50 with the outer surface 62*b*, thereby allowing the pressing portion 75*e* of the rib 75 to press the cap 6 in a well-balanced manner.

Furthermore, in the multifunction peripheral 10 of the embodiment, the cap 6 has the tab 66 as the operation projection projecting from the outer surface 62*b*. Moreover, the rib 75 of the cover 70 has the wall portion (at least one of the upper rib 75*a*, lower rib 75*b* and vertical ribs 75) configured to be located to surround the tab 66 under the condition that the multifunction peripheral 10 is in the normal state. This wall portion of the rib 75 does not contact the cap 6 under the condition that the multifunction peripheral 10 is in the normal state, but the wall portion contacts the cap 6, under a condition that the cap 6 is not appropriately installed in the inlet port 50, such that the movement of the cover 70 from the opened position to the closed position is hindered by the cap 6 intervening between the cover 70 and the tank 4, thereby preventing the cover 70 from reaching the closed position.

With this, the cover 70 cannot be moved from the opened position up to the closed position in the state that the cap 6 is not appropriately installed in the inlet port 50 of the tank 4, namely in the state that the inlet port 50 is not sealed. Thus, it is possible to prevent such a situation that the cap 6 is left in a non-installed state, in an inappropriately installed state, etc.

Further, in the multifunction peripheral 10 of the present embodiment, the rib 75 of the cover 70 has the pair of wall portions (the upper rib 75*a* and the lower rib 75*b*, or adjacent vertical ribs 75*c* among the plurality of vertical ribs 75*c*) configured to face each other with at least a portion of the tab 66 interposed therebetween under the condition that the multifunction peripheral 10 is in the normal state.

With this, the cover 70 cannot be moved from the opened position so as to reach the closed position in the state that the cap 6 is not appropriately installed in the inlet port 50 of the tank 4, namely in the state that the inlet port 50 is not sealed. Thus, it is possible to prevent such a situation that the cap 6 is left in a non-installed state, in an inappropriately installed state, etc.

Further, in the multifunction peripheral 10 of the present embodiment, the rib 75 of the cover 70 has the wall portion (the upper rib 75*a*, the lower rib 75*b*, and the vertical ribs 75*c*) is configured to surround the tab 66 and configured to define the space S3 into which at least a portion of the tab 66 is inserted under the condition that the multifunction peripheral 10 is in the normal state.

With this, the surrounding of the tab 66 of the cap 6 is surrounded by the rib 75 under the condition that the multifunction peripheral 10 is in the normal state, and thus the cover 70 cannot be moved from the opened position up to the closed position in the state that the cap 6 is not appropriately installed in the inlet port 50 of the tank 4, namely in the state that the inlet port 50 is not sealed. Thus, it is possible to prevent such a situation that the cap 6 is left in a non-installed state, in an inappropriately installed state, etc.

Furthermore, the multifunction peripheral 10 of the present embodiment further includes the arm 60 formed of an elastic material and linking the cap 6 with the tank 4 (or with the casing 14). The forward end portion 60*a* of the arm 60 is joined to the cap 6, and the basal portion 60*b* of the arm 60 is joined to the tank 4 (or to the casing 14) at a position above the inlet port 50. Further, the arm 60 is bent by elastic deformation under the condition that the cap 6 is installed in the inlet port 50. Furthermore, the tank 4 and the cover 70 define the space S1 in which the arm 60 is accommodated without contacting the cover 70 under the condition that the cover 70 is in the closed position and the cap 6 is installed in the inlet port 50.

Due to the state that the arm 60 is joined to the cap 6 in the above-described manner, a restoring force, for pulling the cap 6 out of the inlet port 50 by the arm 60 attempting to be elastically recover, acts on the cap 6. In view of this, in the multifunction peripheral 10 of the embodiment, the pressing portion 75*e* of the rib 75 abuts against the cap 6 in a case that the cap 6 is moved in the insertion direction for allowing the cap 6 to be removed from the inlet port 50, thereby restricting the movement of the cap 6 in the insertion direction for allowing the cap 6 to be removed from the inlet port 50. Thus, it is possible to prevent the cap 6 from being removed or detached from the inlet port 50.

Further, in the multifunction peripheral 10 of the present embodiment, the rib 75 of the cover 70 has the pair of wall portions (the upper rib 75*a* and the lower rib 75*b*, or adjacent vertical ribs 75*c* among the plurality of vertical ribs 75*c*) configured to face each other with at least a portion of the tab 66 interposed therebetween under the condition that the multifunction peripheral 10 is in the normal state.

With this, in such a case that the cap 6 is displaced, in the multifunction peripheral 10 in the normal state, in the up-down direction 7 and thus the cap 6 is not appropriately installed in the inlet port 50 of the tank 4, the tab 66 cannot be accommodated between the upper and lower ribs 75*a* and 75*b*. Therefore, in this case, when the cover 70 is rotated from the opened position toward the closed position, any portion of the cap 6 abuts against the upper rib 75*a* or the lower rib 75*b*. Further, in such a case that the cap 6 is displaced in the left-right direction 9 in the multifunction peripheral 10 in the normal state and thus the cap 6 is not appropriately installed in the inlet port 50, the tab 66 cannot be accommodated between adjacent vertical ribs 75 among the plurality of vertical 75*c*. Therefore, in this case, when the cover 70 is rotated from the opened position toward the closed position, any portion of the cap 6 abuts against the adjacent vertical rib(s) 75*c*. As described above, the cover 70 cannot reach the closed position due to the cap 6 which is interposed between the cover 70 and the tank 4.

Furthermore, in the multifunction peripheral 10 according to the embodiment, the rib 75 of the cover 70 has the wall portion (the upper rib 75*a*, the lower rib 75*b* and the vertical ribs 75*c*) surround the tab 66 (surrounds a periphery or circumference portion of the tab 66) and define the space S3 into which at least a portion of the tab 66 is inserted, in the multifunction peripheral 10 in the normal state.

With this, in the state that the cap 6 is not appropriately installed in the inlet port 50, namely in the state that the inlet port 50 is not sealed, the tab 66 cannot be accommodated in the space S3. Therefore, in this case, when the cover 70 is rotated from the opened position toward the closed position, any portion of the cap 6 abuts against the upper rib 75*a* or the lower rib 75*b*. As described above, the cover 70 cannot reach the closed position due to the cap 6 which is interposed between the cover 70 and the tank 4.

Moreover, in the multifunction peripheral 10 according to the embodiment, the ink chamber 40 is provided as the plurality of ink chambers 40 which are arranged side by side to each other in the left-right direction 9 (first direction), and the cap 6 is provided as the plurality of caps 6 corresponding to the plurality of ink chambers 40, respectively, and arranged side by side to each other in the left-right direction 9 (first direction); and the rib 75 of the cover 70 has the two wall portions (upper and lower ribs 75*a* and 75*b*) extending in the left-right direction 9 and the wall portion(s) (respective vertical ribs 75*c*) linking the two wall portions.

With this, the rib 75 has the lattice-like (or grid-like, ladder-like) shape extending in the left-right direction 9 and thus is capable of having the original function as the rib to reinforce the cover 70, thereby enhancing the rigidity thereof, in addition to having the function of forming the space S3 into which the tab 66 of the cap 6 is inserted.

Note that the rib 75 according to the embodiment has the plurality of vertical ribs 75*c* of which number is greater than the number of the cap 6 by not less than two for the purpose of forming the spaces S3 of which number corresponds to the number of the caps 6, or forming the spaces S3 of which number is not less than the number of the caps 6, such that the tabs 66 of the respective caps 6 can be accommodated individually from one another. In a case that the spaces S3 are provided corresponding to the respective caps 6, each of the spaces S3 corresponding to one of the caps 6 is allowed to have a small dimension or size, thereby making it possible to easily catch (to easily abut against) any one of the caps 6 which is not appropriately installed in the inlet port 50. Note that, however, the rib 75 may be formed with the spaces S3 such that one space S3 among the spaces S3 corresponds to two or more pieces of the cap 6.

Further, in the multifunction peripheral 10 according to the embodiment, the rib 75 of the cover 70 is provided with the pressing portion 75*e* configured to face the outer surface 62*b* of each of the caps 6 at the predetermined spacing distance ΔG in the direction parallel to the insertion direction, in which the cap 6 is inserted into or removed from the inlet port 50, under the condition that the multifunction peripheral 10 is in the normal state, the pressing portion 75*e* being configured to abut firstly against (makes contact firstly with) the outer surface 62*b*, among the other portion(s) of the cap 6 different from the outer surface 62*b*, under the condition that the cap 6 is moved, in the multifunction peripheral 10 in the normal state, in the insertion direction for allowing the cap 6 to be removed from the inlet port 50.

With this, under the condition that the cap 6 is moved, in the liquid consuming apparatus in the normal state, in the insertion direction for allowing the cap 6 to be removed from the inlet port 50 (in the direction for allowing the cap 6 to be removed from the inlet port 50), the outer surface 62*b* of the cap 6 and the pressing portion 75*e* of the rib 75 of the cover 70 abut against each other to thereby restrict any further movement of the cap 6 in the insertion direction for allowing the cap 6 to be removed from the inlet port 50. Thus, in a state that the cover 70 is in the closed position, namely, in a state that the cover 70 is closed, the movement of the cap 6, which is installed in the inlet port 50 of the tank 4, in the insertion direction for allowing the cap 6 to be removed from the inlet port 50 is restricted, thereby making it possible to prevent the cap 6 installed in the inlet port 50 of the tank 4 from being removed (detached) from the inlet port 50.

Further, in the multifunction peripheral 10 of the embodiment, the magnitude (extent) of the "predetermined spacing distance ΔG" is not more than a value within a range of the moving amount of the cap 6 by which water-tightness between the tank 4 and cap 6 is maintained under the condition that the cap 6 installed in the inlet port 50 is moved, in the multifunction peripheral 10 in the normal state, in the insertion direction for allowing the cap 6 to be removed from the inlet port 50.

With this, in the liquid consuming apparatus in the normal state, even when the cap 6 installed appropriately in the inlet port 50 of the tank 4 is moved, in the insertion direction for allowing the cap 6 to be removed from the inlet port 50, in a state that the cover 70 is in the closed position, namely that the cover 70 is closed, such movement of the cap 6 is restricted within the range of the moving amount of the cap 6 by which water-tightness between the tank 4 and cap 6 is maintained. With this, it is possible to prevent the ink from leaking out of the inlet port 50 of the tank 4 when the cover 70 is in the closed position, namely when the cover 70 is closed.

Furthermore, in the multifunction peripheral 10 of the present embodiment, the tank 4 has the wall portion (the cylindrical wall 43 and the inclined wall 42) defining the inlet port 50, and the cap 6 has the claw portion 61*b* configured to be located inside the ink chamber 40 and to engage with the opening edge, of the wall portion defining the inlet port 50, on the side of the ink chamber 40 under the condition that the cap 6 is installed in the inlet port 50. Moreover, the magnitude (size, extent) of the predetermined spacing distance ΔG between the forward end portion of the lower rib 75*b* (namely, the pressing portion 75*e*) and the outer surface 62*b* of the flange 62 of the cap 6 has a value corresponding to the length, of the wall portion defining the inlet port 50, in the direction parallel to the extending direction in which the opening central line L of the opening of the inlet port 50 is extended.

With this, even when the cap 6 appropriately installed in the inlet port 50 of the tank 4 is moved in the insertion direction for allowing the cap 6 to be removed from the inlet port 50 in the state that the cover 70 is in the closed position, namely that the cover 70 is closed, such movement of the cap 6 is restricted within the range of the moving amount of the cap 6 by which water-tightness between the tank 4 and cap 6 is maintained. With this, it is possible to prevent the ink from leaking out of the inlet port 50 of the tank 4 when the cover 70 is in the closed position, namely when the cover 70 is closed.

Further, in the multifunction peripheral 10 of the embodiment, the pressing portion 75*e* of the rib 75 is located on the extension of the opening central line L of the opening of the inlet port 50 under the condition that the multifunction peripheral 10 is in the normal state.

With this, when the cap 6 appropriately installed in the inlet port 50 of the tank 4 is moved in the insertion direction for allowing the cap 6 to be removed from the inlet port 50, the pressing portion 75*e* of the rib 75 abuts against the outer surface 62*b* of the flange 62 of the cap 6 at the point of intersection of the opening central line L of the inlet port 50 with the outer surface 62*b*, thereby allowing the pressing portion 75*e* of the rib 75 to press the cap 6 in a well-balanced manner.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the cap 6 according to the embodiment has the claw portion 61*b* provided on the body 61. It is allowable, however, that the body 61 of the cap 6 has a shape without having any waist or bulged portion (namely, a shape without the claw portion 61*b*).

Further, in the cap 6 according to the embodiment, for example, the tab 66 is provided to project from the outer surface 62*b*, of the flange 62, at the outer edge portion which is located to be apart from the central portion of the outer surface 62*b*. According to this configuration, it is possible to press substantially the central portion of the outer surface 62*b* of the flange 62 with the pressing portion 75*e* of the rib 75. It is allowable, however, that the tab 66 is provided on the cap 6 such that the tab 66 is projected from the central portion of the outer surface 62*b* of the flange 62. In such a case, the pressing portion 75*e* of the rib 75 is arranged such that the pressing portion 75*e* presses the outer surface 62*b* of the flange 62, at a location apart or shifted from the central portion of the outer surface 62*b*.

Furthermore, for example, the cover 70 according to the embodiment is disposed in the casing 14 such that the cover 70 is rotatable in the up-down direction 7 about the rotation axis 82L extending in the left-right direction 9 as the rotation center. It is allowable, however, that the cover 70 is disposed in the casing 14 such that the cover 70 is rotatable in the left-right direction 9 (or in the front-rear direction 8) about a rotation axis extending in the up-down direction 7 as the rotation center.

Moreover, for example, although the cap 6 and the tank 4 or the casing 14 according to the embodiment are linked by the arm 60, the arm 60 may be omitted.

From the above explanation, numerous improvements and/or other embodiments of the present teaching will be apparent to a person skilled in the art. Accordingly, the above explanation should be interpreted only as an example and as being provided for the purpose of teaching the best mode for carrying out the present teaching to the person skilled in the art. The configuration and/or the detailed function of the present teaching can be substantially changed, without departing from the spirit and/or gist of the present teaching.

What is claimed is:

1. An ink-jet printer, comprising:

an ink tank including an ink inlet;

a cap configured to move to a sealing position where the cap seals the ink inlet and to a removal position where the cap is removed from inlet; and a cover configured to pivot between a closed position where the cover restricts movement of the cap from the sealing position to the removal position and an open position farther from the ink inlet than the closed position.

2. The ink-jet printer according to claim 1, wherein the cover is configured such that the cap is not accessible from outside of the ink jet printer in a case that the cover is in the closed position.

3. The ink-jet printer according to claim 1, further comprising a restricting part configured to restrict movement of the cover from the closed position to the open position.

4. The ink-jet printer according to claim 1, wherein a distance between the cover in the closed position and the cap in a sealed position at which the cap seals the ink inlet is not more than a distance between the sealed position and a non-sealed position at which the cap does not seal the ink inlet.

5. The ink-jet printer according to claim 4, wherein the cover includes:

an inner surface facing the ink inlet in a case that the cover is in the closed position; and a rib located on the inner surface, and the rib faces a part of the cap, the part sealing the ink inlet, in a case that the cover is in the closed position.

6. The ink-jet printer according to claim 5, wherein the rib extends in a direction crossing a pivot axis of the cover.

7. The ink-jet printer according to claim 4, wherein the cover is away from the cap in a case that the cover is in the closed position and the cap is in the sealed position.

8. The ink-jet printer according to claim 1, further comprising an arm connecting the cap to the ink tank or connecting the cap to a housing of the ink-jet printer.

9. The ink-jet printer according to claim 8, wherein the arm is configured to hold the cap in a position away from the ink inlet in a case that the cap does not seal the ink inlet.

10. An ink-jet printer, comprising:

an ink tank including an ink inlet;

a cap configured to seal the ink inlet; and a cover configured to pivot between a closed position and an open position farther from the ink inlet than the closed position, wherein a distance between the cover in the closed position and the cap in a sealed position at which the cap seals the ink inlet is not more than a distance between the cap in the sealed position and the cap in a non-sealed position at which the cap does not seal the ink inlet.

* * * * *